(12) United States Patent
Lee et al.

(10) Patent No.: US 11,991,145 B2
(45) Date of Patent: May 21, 2024

(54) DEVICE AND METHOD FOR PROVIDING INFORMATION OF APPLICATION SERVER IN MOBILE COMMUNICATION SYSTEM

(71) Applicant: SAMSUNG ELECTRONICS CO., LTD., Suwon-si (KR)

(72) Inventors: Jicheol Lee, Suwon-si (KR); Sunghoon Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/755,617

(22) PCT Filed: Nov. 4, 2020

(86) PCT No.: PCT/KR2020/015341
§ 371 (c)(1),
(2) Date: May 3, 2022

(87) PCT Pub. No.: WO2021/019232
PCT Pub. Date: May 14, 2021

(65) Prior Publication Data
US 2022/0345442 A1 Oct. 27, 2022

(30) Foreign Application Priority Data
Nov. 5, 2019 (KR) .................. 10-2019-0140553
Jan. 6, 2020 (KR) .................. 10-2020-0001734

(51) Int. Cl.
H04L 61/4511 (2022.01)
H04L 61/2517 (2022.01)
H04L 67/147 (2022.01)

(52) U.S. Cl.
CPC ...... H04L 61/4511 (2022.05); H04L 61/2517 (2013.01); H04L 67/147 (2013.01)

(58) Field of Classification Search
CPC . H04L 61/4511; H04L 61/2517; H04L 67/147
See application file for complete search history.

(56) References Cited

U.S. PATENT DOCUMENTS 8,200,842 B1 * 6/2012 Lau .................. H04L 61/4511
709/245
2012/0196601 A1 * 8/2012 Lundqvist .......... H04L 61/4511
455/435.2
(Continued)

FOREIGN PATENT DOCUMENTS

CN 107113343 A 8/2017
CN 109275160 A 1/2019
(Continued)

OTHER PUBLICATIONS

International Search Report and Written Opinion of the International Searching Authority in connection with International Application No. PCT/KR2020/015341 dated Feb. 18, 2021, 11 pages.
(Continued)

Primary Examiner — Jimmy H Tran

(57) ABSTRACT

The present disclosure relates to a device and method for providing a terminal with information of a server in a communication system and, more specifically, to a device and method for providing a terminal with information of an application server in a mobile communication system. According to an embodiment of the present disclosure, a terminal may receive, from a 5G system according to a location of the terminal, an address of a DNS server to access, and receive, from a 5GS, regional information or zone information (hereinafter, referred to as an edge computing service zone ID (ESZI)) which can be used when a query is transmitted to the DNS server. When transmitting a DNS query to the corresponding DNS server, the terminal may include the ESZI in the DNS query and transmit same, and the DNS server having received the DNS query may
(Continued)

search for an edge application server operating in an edge computing environment suitable for (or close to) a current location of the terminal, determine an address of the edge application server, and respond to the terminal. Accordingly, the terminal may access an edge application server that is closest to or most suitable for the current location of the terminal, and use an edge computing service.

14 Claims, 13 Drawing Sheets

(56) References Cited

U.S. PATENT DOCUMENTS

| | | | | |
|---|---|---|---|---|
| 2014/0143428 | A1* | 5/2014 | Zheng | H04L 65/1073 709/226 |
| 2015/0372972 | A1* | 12/2015 | Kennedy | H04L 61/4511 709/245 |
| 2016/0021055 | A1* | 1/2016 | Krzywonos | H04L 61/301 709/245 |
| 2016/0191416 | A1 | 6/2016 | Moon | |
| 2016/0197877 | A1* | 7/2016 | Choi | H04L 61/4511 709/217 |
| 2017/0048186 | A1* | 2/2017 | Blinn | H04L 61/4552 |
| 2018/0317157 | A1 | 11/2018 | Baek et al. | |
| 2019/0274185 | A1* | 9/2019 | Stojanovski | H04L 47/2441 |
| 2020/0008044 | A1* | 1/2020 | Poornachandran | H04L 41/5019 |
| 2020/0280822 | A1* | 9/2020 | Stammers | H04W 4/02 |
| 2020/0351724 | A1* | 11/2020 | Guo | H04L 67/10 |
| 2020/0404069 | A1* | 12/2020 | Li | H04L 67/59 |
| 2021/0075761 | A1* | 3/2021 | Li | H04L 61/103 |
| 2021/0176613 | A1* | 6/2021 | Purkayastha | H04L 67/10 |
| 2021/0176769 | A1* | 6/2021 | Chou | H04W 72/542 |
| 2021/0320896 | A1* | 10/2021 | Feng | H04W 8/26 |
| 2021/0345108 | A1* | 11/2021 | Li | H04W 72/53 |
| 2021/0345113 | A1* | 11/2021 | Parron | H04L 12/4645 |
| 2022/0124065 | A1* | 4/2022 | Dao | H04L 61/5007 |
| 2022/0174032 | A1* | 6/2022 | Zhu | H04L 45/74 |
| 2022/0174033 | A1* | 6/2022 | Ke | H04L 61/5084 |
| 2022/0182890 | A1* | 6/2022 | Shan | H04W 4/50 |
| 2022/0191165 | A1* | 6/2022 | Zhu | H04W 48/18 |
| 2022/0191292 | A1* | 6/2022 | Skubic | H04W 36/12 |
| 2022/0377046 | A1* | 11/2022 | Zhang | H04L 67/51 |
| 2022/0394088 | A1* | 12/2022 | Salkintzis | H04L 67/1036 |
| 2023/0062253 | A1* | 3/2023 | Ganguli | H04L 67/10 |
| 2023/0354149 | A1* | 11/2023 | Xu | H04L 61/4511 |
| 2023/0396582 | A1* | 12/2023 | Roy | H04L 61/4541 |

FOREIGN PATENT DOCUMENTS

| | | |
|---|---|---|
| EP | 4 016 962 A1 | 6/2022 |
| KR | 10-2020-0115155 A | 10/2020 |

OTHER PUBLICATIONS

Huawei et al., "Pseudo-CR on Edge Application Server Discovery based on DNS", S6-191886 (revision of S6-191725), 3GPP TSG-SA WG6 Meeting #33, Sep. 2-6, 2019, Sophia Antipolis, France, 3 pages.

Huawei et al., "Solution for Fetch target Edge AS API", S6-191898 (revision of S6-191782), 3GPP TSG-SA WG6 Meeting #33, Sep. 2-6, 2019, Sophia Antipolis, France, 3 pages.

Samsung, "Discussion on Edge Application Discovery", S6-191354, 3GPP TSG-SA WG6 Meeting #32, Jul. 8-12, 2019, Roma, Italia, 3 pages.

Futurewei, "Key issue on Discovery of Edge Application Server", S2-1908809, SA WGZ Meeting #S2-135, Oct. 14-18, 2019, Split Croatia, 1 page.

Supplementary European Search Report dated Oct. 14, 2022 in connection with European Patent Application No. 20 88 5980, 8 pages.

Office Action issued Mar. 26, 2024, in connection with Chinese Patent Application No. 202080091661.3, 19 pages.

* cited by examiner

DEVICE AND METHOD FOR PROVIDING INFORMATION OF APPLICATION SERVER IN MOBILE COMMUNICATION SYSTEM

CROSS-REFERENCE TO RELATED APPLICATIONS

This application is a 371 of International Application No. PCT/KR2020/015341, filed Nov. 4, 2020, which claims priority to Korean Patent Application No. 10-2019-0140553, filed Nov. 5, 2019, and Korean Patent Application No. 10-2020-0001734, filed Jan. 6, 2020, the disclosures of which are herein incorporated by reference in their entirety.

BACKGROUND

1. Field

The disclosure relates to a device and a method for providing information of a server to a terminal in a communication system and, more particularly, to a device and a method for providing information of an application server to a terminal in a mobile communication system.

2. Description of Related Art

To meet the demand for wireless data traffic having increased since deployment of 4G communication systems, efforts have been made to develop an improved 5G or pre-5G communication system. Therefore, the 5G or pre-5G communication system is also called a "beyond 4G network" communication system or a "post long term evolution (post LTE)" system.

The 5G communication system is considered to be implemented in ultrahigh frequency (mmWave) bands (e.g., 60 GHz bands) so as to accomplish higher data rates. To decrease propagation loss of the radio waves and increase the transmission distance in the ultrahigh frequency bands, beamforming, massive multiple-input multiple-output (massive MIMO), full dimensional MIMO (FD-MIMO), array antenna, analog beam forming, large scale antenna techniques have been discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

For the 5G system, studies are being conducted to support a wider variety of services than the existing 4G system. For example, the most representative services of the 5G system include an enhanced mobile broadband (eMBB) service, an ultra-reliable and low latency communication (URLLC) service, a massive machine type communication (mMTC) service, an evolved multimedia broadcast/multicast service (eMBMS), and the like. Further, a system for providing the URLLC service may be referred to as a URLLC system, and a system for providing the eMBB service may be referred to as an eMBB system. In addition, the terms "service" and "system" may be used interchangeably.

Among these services, the URLLC service is a service that is newly considered in the 5G system, in contrast to the existing 4G system, and requires to satisfy ultrahigh reliability (e.g., packet error rate of about 10-5) and low latency (e.g., about 0.5 msec) conditions compared to the other services. In order to satisfy such strict requirements, the URLLC service may need to apply a transmission time interval (TTI) that is shorter than that of the eMBB service, and various operating methods using this are under consideration.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched.

Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (cloud RAN) as the above-described big data processing technology may also be considered an example of convergence of the 5G technology with the IoT technology.

Meanwhile, there is ongoing discussion regarding an edge computing technology for transmitting data by using an edge server. The edge computing technology may include multi-access edge computing (MEC) or fog computing, for example. The edge computing technology may refer to a technology for providing data to an electronic device through a separate server (hereinafter, referred to as edge server or MEC server) installed in a position geographically close to the electronic device (for example, installed inside or near a base station). For example, an application requiring a low latency among at least one application installed in an electronic device may transmit/receive data through an edge server installed in a geographically close position without going through a server positioned in an external data network (DN) (for example, Internet).

SUMMARY

An electronic device such as a mobile terminal or user equipment needs to access an edge server in order to use an edge computing service. However, the edge server may be disposed in each region, and the electronic device thus needs to know which edge server is to be accessed in the corresponding region.

However, a method capable of providing information regarding which edge server is to be accessed, according to the position of the electronic device, has not yet been provided.

Therefore, the disclosure provides a device and a method for providing information regarding an edge server to be accessed, based on the position of an electronic device such as a mobile terminal, user equipment, or terminal.

A method according to an embodiment of the disclosure may include at least one procedure from among: a procedure of determining, in connection with a PDU session that a terminal has requested connection to, whether the terminal that has requested the corresponding PDU session is a terminal using an edge computing service, with reference to subscription information, in a node of a SMF device of a mobile communication system; a procedure of identifying, with regard to the corresponding PDU session, an edge computing service zone ID (ESZI) capable of indicating to which EDN (or edge computing service area) the PDU session is connected, based on the current position of the terminal (or a procedure of identifying the same with regard to each UPF service area or SMF service area); a procedure of determining, with regard to the corresponding PDU session, to provide an ESZI (or DNAI) capable of indicating to which EDN the PUD session is connected, to the terminal; and a procedure of including the ESZI (or DNAI) in a PDU Session Establishment Accept message and transmitting the same to the terminal.

As another example, the method may further include a procedure in which the SMF determines to configure a list regarding position information (TAI, Cell ID) and the ESZI and to provide the same to the terminal, and transmits the same to the terminal.

A method according to an embodiment of the disclosure is a method of a terminal in a mobile communication system and may include at least one procedure from among: a procedure in which the terminal receives an ESZI (or DNAI) included in a PDU Session Establishment Accept message; a procedure in which the terminal delivers the corresponding ESZI (or DNAI) information from a NAS layer to an upper layer to be used during a DNS procedure (AT Command is utilized); and a procedure in which a DNS resolver of the termina includes the corresponding ESZI (or DNAI) information during DNS query transmission.

As another example, the method may further include a procedure in which the terminal identifies the ESZI regarding the current position, based on the received list, and notifies the DNS revolve of the same, thereby using the same for a DNS query.

As another example, the method may further include a procedure in which the terminal receives an IP address list of an application server in response to the DNS query, and then maps the ESZI and an information element included in the corresponding list, thereby selecting a single IP address.

A method according to an embodiment of the disclosure is a method of a DNS server in a mobile communication system, wherein the DNS server may refer to ESZI information sent by a terminal to a DNS query, and may accordingly determine to return the address of an application server in which edge computing environment in which position.

In another method, the DNS server may receive a DNS query of the terminal, may identify the same, and may return an IP address list of multiple application servers regarding a FQDN indicated by the DNS query received from the terminal, together with ESZI information, to the terminal.

In addition, a procedure in which the DNS servers returns a newly generated ESZI that can be identified by itself to a 5GS, and a procedure in which the 5GS returns this information to a terminal using the edge computing service, may be additionally provided.

According to an embodiment of the disclosure, a terminal may receive the address of a DNS server to be accessed according to the position of the terminal from a 5G system, and may receive, from the 5GS, region information or zone information that may be used to send a query to the DNS server (hereinafter, ESZI: Edge Computing Service Zone ID). Accordingly, when sensing a DNS query to the corresponding DNS server, the terminal may include an ESZI thereto and transmit the same, and the DNS server, after receiving the same, may search for an edge application server driven in an edge computing environment appropriate (or close) to the current position of the terminal, may determine the address of the edge application server, and may respond to the terminal. In addition, upon receiving a DNS response from the DNS server, the terminal may select an IP address having a value corresponding to the ESZI from the IP address list of multiple application servers included in the response, thereby finishing the DNS resolution procedure. As a result, the terminal becomes able to access an edge application server closest or most appropriate to the current position of the terminal, and may use an edge computing service. The terminal may acquire information of the ESZI through a basic operation such as establishing data connection with a mobile communication system, or accessing the mobile communication system and exchanging policy information. In addition, the mobile communication operator may provide corresponding information only to an authorized terminal such that the edge computing service can be used. In addition, according to a function of recognizing the position of the terminal, which is a basic function of the mobile communication system, the terminal may receive an ESZI appropriate for the current position of the terminal.

Advantageous effects obtainable from the disclosure may not be limited to the above-mentioned effects, and other effects which are not mentioned may be clearly understood, through the following descriptions, by those skilled in the art to which the disclosure pertains.

DETAILED DESCRIPTION

Figure 1:
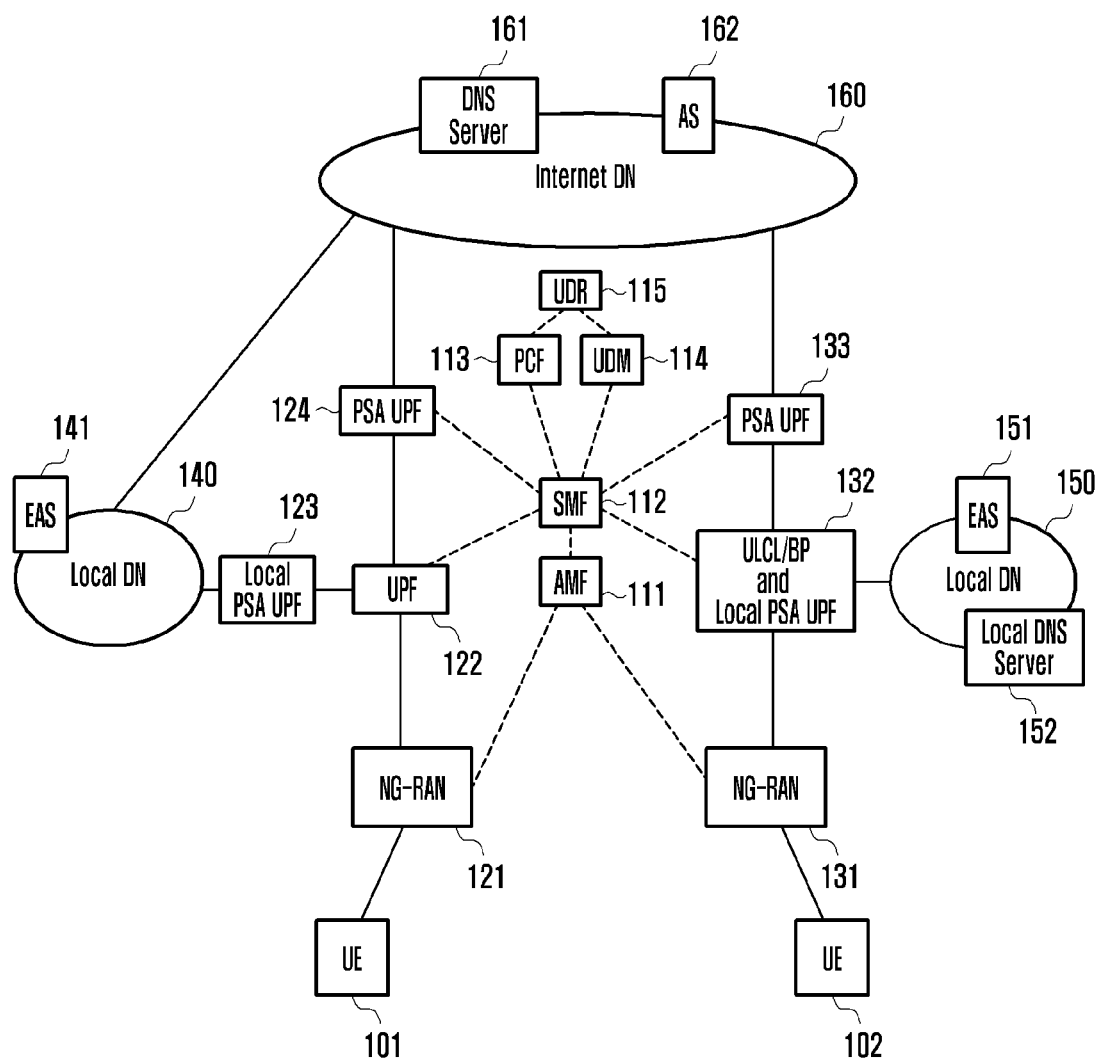
FIG. 1 illustrates a system architecture and a relationship diagram of a 5G mobile communication system providing an edge computing service according to an embodiment of the disclosure.

Hereinafter, exemplary embodiments of the disclosure will be described in detail with reference to the accompanying drawings. It should be noted that, in the drawings, the same or like elements are designated by the same or like reference signs as much as possible. Further, a detailed description of known functions or configurations that may make the subject matter of the disclosure unclear will be omitted.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Herein, it will be understood that each block of the flowchart illustrations, and combinations of blocks in the flowchart illustrations, can be implemented by computer program instructions. These computer program instructions can be provided to a processor of a general-purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card. Further, the "unit" in the embodiments may include one or more processors.

On the other hand, an architecture for implementing an edge computing service in the 3GPP next-generation communication system is being continuously discussed. Edge computing technology may be referred to as mobility edge computing or multi-access edge computing, and in the disclosure, the edge computing technology will be referred to as MEC for convenience. MEC is a technology that installs a gateway (or UPF) in or close to a wireless base station, and applies distributed cloud computing technology on the gateway to deploy various services and caching contents close to a user terminal to alleviate congestion in the mobile core network, achieves low-latency communication in data communication with the UE, and generates new services based on the above alleviated congestion and low-latency communication. The MEC system provides application developers and content providers with cloud computing capabilities and IT service environments at the edge of mobile networks. In particular, the MEC system provides ultra-low latency and high-capacity bandwidth, and allows the application applications to access real-time network information. Accordingly, the application applications that provide MEC services may provide services to the UE through the 5G system. In addition, the 5G system may provide a function for a UE using the MEC service to access the MEC system. In addition to the 5G system, the 4G system may also provide functions for MEC services.

For convenience of description below, some terms and names defined in the 3rd generation partnership project long-term evolution (3GPP) standard may be used. However, the disclosure is not limited by the above terms and names, and may be equally applied to systems conforming to other standards. In addition, prior to the description of each of the specific embodiments (FIGS. 1 to 13), all matters applied to the overall content of the disclosure will be reviewed.

The UE described below must connect to the edge application server in order to use the edge computing service. However, the edge application server may be deployed for each area, or may be deployed on the edge computing environment in the edge data network arranged for each area. Accordingly, the UE must be able to obtain the IP address of the edge application server that may be accessed in the corresponding area. In general, the UE obtains the IP address of the application server by using the DNS procedure. Accordingly, the UE needs a method for obtaining the address of the edge application server to which the UE should access from the corresponding DNS server. The following three deployment models may be considered to support the edge computing service.

Model 1: A model in which a mobile network operator (MNO) controls edge computing service (MNO manages all connectivity and platform)

Model 2: A model in which the edge computing service provider contracts with the MNO to control the service (MNO provides data connection and routing functions)

Model 3: A model in which a 3rd party cloud service provider (e.g., AWS and Azure) controls the service (MNO only provides connection to Data Network)

For model 1, model 2, and model 3, the DNS server may be centralized and operational, or may be distributed and operated. If the DNS server is centralized, it may be implemented as follows in response to each model. According to model 1, only one DNS server may exist in the MNO. According to model 2, the edge computing service provider may operate one centralized DNS server. According to model 3, a 3rd party cloud company may operate one centralized DNS server. If the DNS server is distributed, it may be implemented as follows in response to each model. According to model 1, the MNO may establish and operate the DNS server for each specific area. According to model 2, the edge computing service provider may establish and operate the DNS server for each specific area even within the area where the MNO provide the service. According to model 3, a 3rd party cloud company may establish and operate the DNS server for each specific area.

The disclosure proposes a method for enabling a UE to send a DNS query including specific area information so that the DNS server may determine the IP address of the application server running in the corresponding edge computing service area. To this end, a method of providing a UE with a parameter indicating area information to be used in the DNS query is proposed in 5GS.

In addition, the disclosure defines a parameter called the edge computing service zone identifier (ESZI). ESZI refers to a kind of Zone ID that may identify which IP domain to search for, which IP range to search for, which area to search for a deployed data network, or which area to search for a deployed edge computing environment in the domain name system (DNS) server. After receiving and identifying the ESZI included in the information area indicating the zone in the DNS query delivered by the UE, the DNS server may identify in which location the application server that the UE is searching for is running, in which edge computing environment the application server is running, or in which IP domain the application server is running. Accordingly, the IP address of the application server corresponding to the location requested by the UE may be transmitted to the UE as a response. As another method, when the DNS server sends a response to the DNS query of the UE, the DNS server may configure the IP address list of the application server to be searched by the UE together with the ESZI value. The information configured as described above may be returned to the UE by being included in the response to the DNS query or the response message. The UE may select the IP address of the application server mapped to the configured ESZI received by the UE based on the ESZI value received in the DNS response.

The ESZI may be expressed as a data network access ID (DNAI) that identifies between a PDU session anchor (PSA) UPF and a data network connection in a 5G system. The mobile network operator may know which data network the UE accessed through the DNAI, an identifier connected to the data network. Accordingly, after connecting the edge data network closest to or most suitable for the UE to be connected to the UE, the DNAI capable of identifying the connection may be provided to the UE. Therefore, if DNAI is used as ESZI information, the mobile network operator may identify the data network accessed by the UE, or the IP domain accessed by the PSA UPF that provides data communication to the UE, or the Edge Computing Environment accessed by the PSA UPF. In a case where the mobile operator directly runs the DNS server, the DNAI value may be configured in the DNS server. Accordingly, the DNS server may search for the IP address of the edge application server to which the UE tries to access through the DNAI value (i.e., ESZI value) included in the DNS query by the UE, and may provide the IP address of the edge application server to the UE.

According to another embodiment of the disclosure, the ESZI may be information that may indicate areal division of an IP domain managed by the 3rd party cloud service provider, or a division on an area or topology of available cloud resources. Alternatively, the ESZI may be tag information mapped with the information. For example, if the areal ID of a resource managed by the 3rd party cloud service provider is seoul-1, the ESZI may have a value of seoul-1. Alternatively, if a mapped value that may search for seoul-1 in the DNS server provided by the 3rd party cloud service provider, for example, location-x is information mapped to seoul-1, location-x may be the ESZI. In this case, the 3rd party cloud service provider may generate the ESZI in 5GS according to the resource the 3rd party cloud service generated, the resource the 3rd party cloud service manages, or the IP domain the 3rd party cloud service manages, and may provide the ESZI to 5GS. The 5GS may provide the ESZI to the UE so that the UE may include the ESZI when performing a DNS query by connecting to a DNS server managed by the 3rd party cloud service provider.

According to another embodiment of the disclosure, the ESZI may be SRV, LOC, or TXT format resource record information used in the DNS protocol. The format of SRV, LOC, and TXT which are extension records of DNS may follow the format of RFC 1035. This information may be displayed along with the address of the application server in response to the DNS query. The UE may determine which application server IP address to select by viewing the ESZI included in the DNS response. In a case where the UE has an ESZI provided from the 5G system, the ESZI information received from the 5G system may be used in the DNS Resolver of the UE. In addition, the UE may determine to use the IP address of the corresponding application server after identifying whether the DNS response includes a value mapped with the ESZI.

In addition, after the operation of a specific signal flowchart, each of the signal flowcharts of the specific embodiments (FIGS. 1 to 13) described below may be followed by the operation of another signal flowchart, or in the middle of the signal flowchart, the signal flow of another diagram may be continuously applied or a part of the signal flow may be applied. For example, the operation of the step 301 of FIG. 3 described below is an operation that may be performed at first or in the middle of all signal flow charts. That is, if the location of the UE is initially searched, it may be applied preferentially to all signal flowcharts, and a handover operation or a location change of the UE is an operation that may be considered along with other flowcharts if such an event occurs. Because it is difficult to describe how all steps of all flowcharts in the disclosure may be combined, combinations may be expected/considered at a normal level by those skilled in the art.

First, the network entity or network nodes illustrated in FIG. 1 will be described as follows.

The core network of 5G may consist of the following network functions. Here, each of the network functions (NF) may be one network node. One network node may take a physically and/or logically independent form, and may be configured along with other specific nodes. In addition, each network function may be implemented to a specific device as described above. As another example, each network function may be implemented in a form in which a device and software are combined. As another example, each of the network functions may be implemented in software in a device on a specific collective network. Hereinafter, each network function will be denoted as "~ function device" or abbreviations of network functions will be used as it is. Even if the abbreviation is used as it is, those skilled in the art may fully understand that the abbreviation is operated in a specific device rather than a simple function. In addition, each of these NFs is a specific instance type, and two or more identical or different instances may be driven in one device. Even if each NF is driven in such an instance form, it may be understood the same as NFs described in the disclosure. Next, the network functions of the core network of 5G will be described below.

The access and mobility management function (AMF) 111 may perform a network function for managing the mobility of the UE. The session management function (SMF) 112 may perform a network function for managing the packet data network connection provided to the UEs 101 and 102. This connection is called a protocol data unit (PDU) session. The policy and charging function (PCF) 113 may perform a network function for applying a service policy of a mobile network operator to the UEs 101 and 102, a charging policy, and a policy for a PDU session. The unified data management (UDM) 114 may perform a network function for storing information on subscribers. The network exposure function (NEF) (not shown) may access to information on managing a UE in the 5G network, so the network exposure function may perform subscription to the mobility management event of the device, subscription to the session management event of the UE, requesting session-related information, configuration of charging information of the corresponding UE, and request to change the PDU session policy for the corresponding UE. In addition, the NEF may provide the 5G network with the information required for service and provide a function to store the information in the UDR. In FIG. 1, NG-RANs 121 and 131 refer to base stations that provide wireless communication functions to respective UEs 101 and 102. The user plane function (UPF) 122 serves as a gateway through which the UE 101 transmits and receives packets. The UPF 122 may be located close to and access the edge data network that is the local data network 140 in order to support the MEC, and thus may transmit data to the edge application server 141. That is, it is possible to achieve low-latency transmission by transferring the data packet to the edge application server 141 in the edge data network 140 without going through the Internet. The UPF 122 may also be connected to the data network 160 connected to the Internet, and the UPF 122 may route data to be transmitted to the Internet among packets delivered by the UE 101 to the Internet data network 160. That is, the UPF 122 may deliver data transmitted to the Internet to the Internet data network 160 through the PSA UPF 124 serving as an anchor of the PDU Session.

Accordingly, the certain UPF may be the PSA UPF 123 serving as an anchor of a PDU session connected to the data network 140. All data transmitted from the UE 101 to the data network 140 is transmitted through the anchor UPF 123. Data packets destined for the centralized data network 140 or Internet data network 160 are delivered to the PSA UPFs 123 and 124 of the corresponding PDU session. Similarly, if the edge data network is deployed for each specific area, such as the local data network, another local PSA UPF 132 accessible to the corresponding local data network 150 may exist. The PDU session for this PSA UPF 134 may exist independently.

As another method, the uplink classifier (ULCL) UPF or the branching point UPF (in case of PDU session supporting IPv6 Multi-homing, the PDU session may be connected to multiple PSA UPFs based on the branching point UPF) 132 may be connected to a local PSA UPF branched to the local data network 150 for one PDU session. The ULCL UPF or the branching point UPF (hereinafter referred to as BP UPF) may view the IP address (target IP Address) transmitted from the UE 102 and determine whether to send the IP address to the local PSA UPF or to another PSA UPF 133. The ULCL UPF or BP UPF 132 may itself serve as the local PSA UPF. Accordingly, a function capable of transmitting a packet to the local data network 150 may be provided.

The SMF 112 may insert/replace/remove the ULCL UPF or the BP UPF 132 according to the location of the UEs 101 and 102 or the network deployment situation. That is, if the SMF 112 that provides a PDU session that transmits data to a centralized or cloud, such as Internet Data Network 160, determines that there is a local data network through which UEs 101 and 102 may access at a specific location, the SMF 112 may insert ULCL UPF or BP UPF 132 to provide data connection to the corresponding local data network. In this case, only the data connection structure in the network may be changed without the impact on the UEs 101 and 102. That is, the AMF may branch and transmit packets delivered by the UEs 101 and 102 to the local data network 140 or 150 or to the central data network by the operation of only the 5G System without the UEs 101 and 102 recognition.

In addition, the SMF 112 may provide a function called a session and service continuity (SSC) mode. This follows the definition of SSC mode defined in 3GPP. The SMF 112 may change the PSA in SSC mode 2 or SSC mode 3. Accordingly, if there is an edge data network to which the UEs 101 and 102 may access according to the current location of the UEs 101 and 102, the SMF may allocate a new PSA that may be connected to the corresponding edge data network, and may change the PDU session or newly generate a PDU session so that data is transmitted through this PSA. For example, the data path may be changed by performing the PDU session modification procedure, or the UEs 101 and 102 may be triggered to establish a new PDU session. With insertion/replacement of the ULCL UPF or BP UPF 132 or the operation according to the SSC mode as described above, the SMF 112 may enable the UEs 101 and 102 to be connected to the local data network that is the edge data network, and accordingly, the UEs 101 and 102 may access the edge application servers 141 and 151 or the local DNS server 152 in the local data networks 140 and 150. Although only one local DSN server 152 is illustrated in FIG. 1, the local DNS server may also be included in the local DN 140.

The MEC system structure may be composed of UEs 101 and 102, an edge enabler server (not shown in FIG. 1), and a configuration server (not shown in FIG. 1). The UEs 101 and 102 supporting the MEC system include an MEC enabling layer in the UE. The edge enabler server refers to a server that the UE accesses to use the MEC service, and the third-party application servers 141 and 151 are driven in the edge enabler server. In addition, in order to indicate the edge enabler server, terms such as edge computing server, MEC server, MEC server, multi-access edge host, edge computing platform, MEC cloudlets, and edge hosting environment may be used interchangeably, but is not limited thereto. The configuration server performs a function to transmit configuration information for using the MEC service to the UEs 101 and 102, and is also called an edge data network configuration server. The configuration server knows the deployment of edge enabler servers by location. Alternatively, the configuration server may know the address of the DNS server deployed in each edge data network. The UEs 101 and 102 may access the configuration server and receive configuration information necessary for using the MEC service, for example, edge enabler server information or DNS server address to be accessed at a specific location. In addition, the configuration server may be referred to as a term for an edge enabling configuration function and an edge data network configuration server, but is not limited thereto, and may correspond to an access server capable of receiving configuration information for a UE to use the MEC service.

In addition, there may be a DNS server for the MEC service. This DNS server may be used to resolve the IP address of the application server running within the edge data network. The DNS server may exist for each edge data network covering a specific area, or one DNS server may exist in the entire MEC system. In a case where the DNS server for MEC exists for each edge data network covering a specific area, the UEs 101 and 102 must know information of the DNS server on the corresponding location. As such, information on the DNS server that may be accessed according to the location of the UEs 101 and 102 may be provided to the UEs 101 and 102 according to an embodiment of the disclosure to be described below. In a case where one DNS server for MEC exists in the entire MEC system, this DNS server must know the edge server information installed throughout the network and information on the application servers that may be provided by the MEC system.

In addition, the DNS server may support the zone function for distinguishing a resource in a specific area, an IP domain, or a specific namespace. This refers to a kind of Zone ID that may identify which IP domain to search for, which IP range to search for, which area to search for a deployed data network, or which area to search for a deployed edge computing environment in the DNS server. In addition, this may be information that may indicate areal divisions of IP domains, or areal or topological divisions of available clould resources. After viewing the ESZI included in the information area indicating the zone in the DNS query delivered by the UE 101 and 102, the DNS server may identify in which location the application server that the UE is searching for is running, in which edge computing environment the application server is running, in which IP domain the application server is running, in which resource area the application server is running, or in which namespace the application server is running. Accordingly, the IP address of the application server corresponding to the location requested by the UE 101 and 102 may be transmitted to the UE as a response. As another method, when the DNS server sends a response to the DNS query of the UE, the DNS server may configure the IP address list of the application server to be searched by the UE together with the ESZI value and transmit the same to the UE. The UE may select the IP address of the application server mapped to the configured ESZI received by the UE based on the ESZI value received in the DNS response.

The UEs 101 and 102 may access the 5G system (3GPP Network) through the 5G base stations 121 and 131 and establish a data connection. The 5G system may allocate a UPF that may be accessed through the corresponding edge data network in order to provide the MEC service to the UE, and through this UPF, the UE may communicate with a third-party application server running on the edge, that is, the edge application server.

A third-party Internet service provider, for example, a clould service provider, may provide an edge computing service itself. That is, the third-party service provider may build its own edge data networks throughout the area and deploy the corresponding edge data network to be connected to the mobile communication system of the MNO. The third-party service provider may negotiate with the PCF or NEF of the 3GPP network. Through this negotiation, the third-party service provider may provide information necessary to use the MEC service to the 5G mobile communication system through the PCF or NEF.

Figure 2:
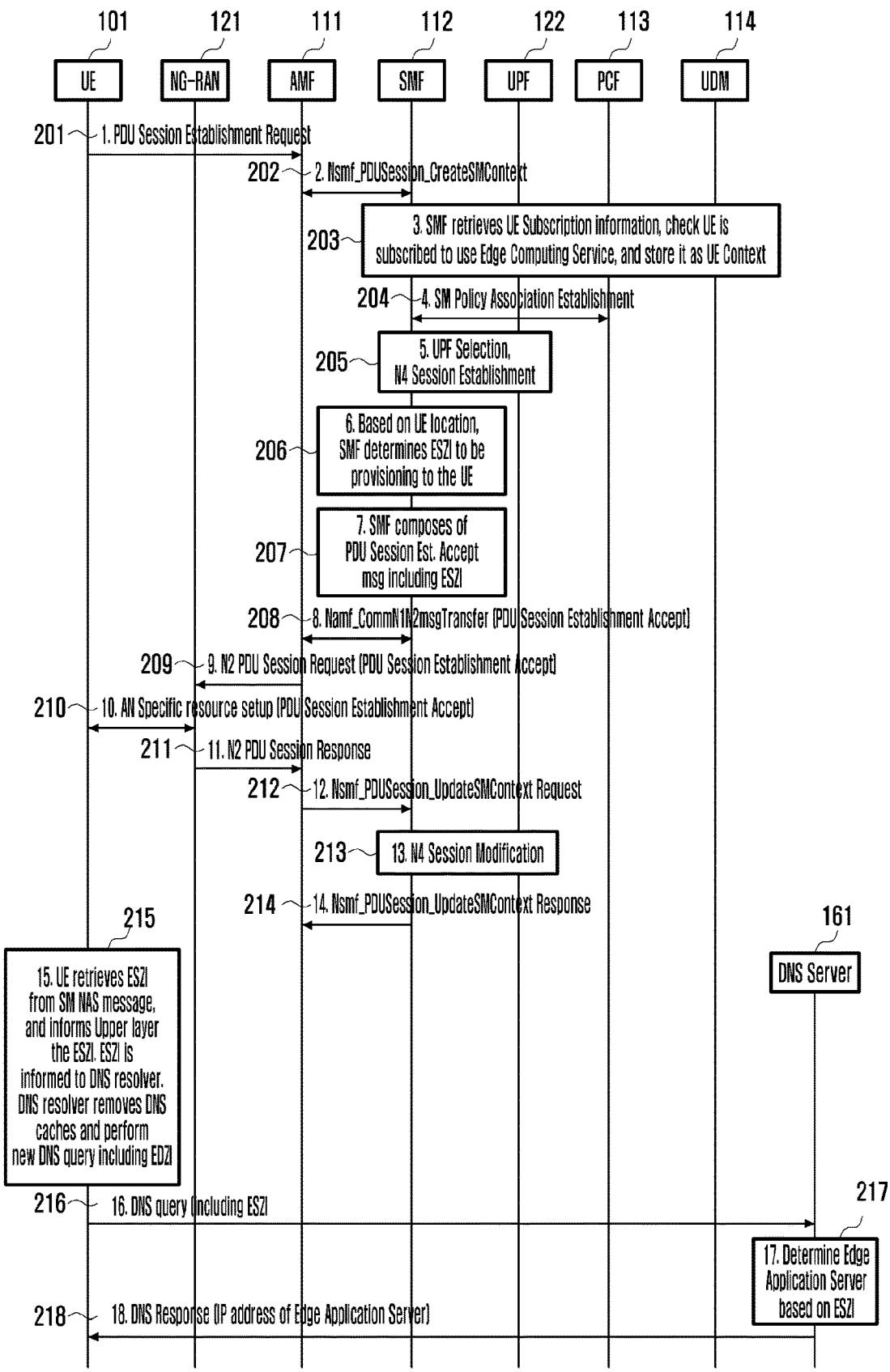
FIG. 2 is a diagram illustrating a procedure providing ESZI information that a UE should use in a DNS procedure to search for an appropriate edge application server to the UE when the UE according to an embodiment of the disclosure establishes a PDU Session.

FIG. 2 is a signal flowchart illustrating a PDU session estimation for a UE to connect to a 5G system and establish a data connection according to various embodiments of the disclosure.

FIG. 2 to be described below will be described using some of the components of FIG. 1. However, it may be understood through the following description that components not used in FIG. 1 may be applied in the same or similar manner even when using, for example, the UE 102, the ULCL/BP UPF, or the Local UPF 132. In addition, in the following embodiments, in a case where another NF corresponding to ULCL/BP UPF or Local UPF 132 is defined in the standard specification, the same may be applied even when the corresponding NF performs the operation according to the disclosure.

Through the procedure of FIG. 2 of the disclosure, the UE 101 may obtain a usable edge computing service zone ID (ESZI) from a 5G system when the UE 101 sends a DNS query to search for an edge application server to be accessed to use an MEC service. Alternatively, when the UE 101 receives a response to the obtained DNS query, the UE 101 may identify and use the ESZI included in the DNS response. For example, the UE 101 may receive the DNS response, and the response may include the following contents.

FQDN: Edge.game.samsung IP: 10.10.1.0 "edge_samsung"
FQDN: Edge.game.samsung IP: 192.10.1.1 "cloud"
FQDN: Edge.game.samsung IP: 170.20.10.2

If the UE 101 receives the information "edge_Samsung" by ESZI through the procedure of FIG. 2 described below, the UE 101 may select an IP address having the information "edge_Samsung" in the DNS response. In addition, the extended record corresponding to the following "XXX" does not necessarily have to be text, but may be an IP subnet address.

Then, it will be described with reference to FIG. 2 below.

In step 201, the UE 101 may configure a PDU session establishment request message, which is a session management (SM) non-access stratum (NAS) message in order to establish a PDU session, and transmit the PDU session establishment request message to the AMF 111. The UE 101 includes a data network name (DNN) to be used by the UE 101 in the PDU session establishment message, and the UE 101 may set this DNN as a DNN value for MEC. According to another embodiment of the disclosure, the default DNN that the UE 101 should use in the 5G system may be a DNN that may use the MEC. The DNN information may be used when determining whether the corresponding DNN is the DNN for the MEC that the UE 101 is permitted to use in the SMF 112 or the PCF 113 in the later steps. The DNN value for MEC may be based on a value preset in the UE 101. According to another embodiment of the disclosure, the UE 101 may include an indicator indicating that the PDU session requested by the UE 101 is a PDU session to use the MEC service in the PDU session establishment message. In a case where the mobile operator uses a DNN as a general DNN for MEC service, for example, Internet DNN, when the UE 101 requests a PDU Session with Internet DNN, it may not be determined whether the PDU session is the PDU session to use MEC, so the UE 101 may include the above-described indicator in the PDU session estimation message and transmit the same. The indicator may include a meaning that a session policy for the MEC service needs to be applied to the corresponding PDU Session. This may be used when determining that the MEC service may be applied to the corresponding PDU session in the SMF 112 or the PCF 113 in the later steps.

In step 202, the AMF 111 selects the SMF 112 based on the DNN value or the location of the UE 101, and transmits the Nsmf_PDUSession_CreateSMContext request message to the selected SMF 112. The AMF 111 may include the PDU session establishment request message received from the UE 101 in this message.

In step 203, in order to view the PDU session estimation request message received from the UE 101 and obtain session-related subscription information for the UE 101, the SMF 112 may perform a procedure of registering that the SMF itself is the serving SMF in the UDM 114 and a procedure of obtaining subscription information for session management of the UE.

The session management related subscription information provided by the UDM 114 to the SMF 112 may include authorization information regarding whether the UE 101 may use the MEC service. That is, information on whether the UE 101 is a UE capable of using the edge computing service is included in the subscription information, and the SMF 112 received this subscription information may determine (or identify) that the UE 101 uses the edge computing service and may determine to provide the edge computing service to the corresponding UE 101. The SMF 112 stores that the corresponding UE 101 is a UE using the edge computing service in a UE context.

In step 204, the SMF 112 may view the PDU session estimation request message received from the UE 101 and perform the SM policy association establishment procedure with the PCF 113 for the corresponding DNN. In this case, the SMF 112 may transmit the DNN requested by the UE 101 to the PCF 113. Upon receiving this information, PCF 113 may determine that the corresponding DNN is a DNN for the MEC service, and then include information available for the MEC service in the session-related policy to be delivered to the SMF 112. According to another embodiment of the disclosure, if the UE 101 includes an indicator for using the MEC service in the corresponding PDU session establishment request in step 201, the SMF 112 may perform the SM Policy association establishment procedure including an indicator informing the PCF 113 that the corresponding PDU Session is for using the MEC service, and upon receiving this information, PCF 113 may configure the session-related policy to be delivered to the SMF 112 by including information that may use the MEC service. In addition, when performing the SM policy association establishment procedure to the PCF 113, the SMF 112 may inform the PCF 113 including information on the current location of the UE 101 (e.g., cell ID and tracking area). The PCF 113 may determine which information to provide based on the location information of the UE 101 when transmitting MEC-related information to the SMF 112 with respect to the PDU session of the UE 101.

In addition, according to the optional operation of step 203, the SMF 112 may view subscriber information of the UE 101 and identify whether the UE 101 is permitted to use the MEC service. If the UE 101 is a UE authorized to use the MEC service or if the DNN requested by the UE 101 is a DNN authorized to use the MEC service, the SMF 112 may transmit an indicator that the use of the MEC service is permitted when establishing a policy association with the PCF 113. Based on this, the PCF 113 may configure MEC service-related information on the corresponding UE 101 and transmit the MEC service-related information to the SMF 112.

The PCF 113 may include information for an MEC service in session-related policy information that should be provided to the SMF 112 through the above procedure. The PCF 113 may determine whether to provide information for an MEC service based on user information stored in the unified data repository (UDR) 115. The information for the MEC service may refer to a DNS server address to be accessed when the UE 101 uses the MEC service through the corresponding PDU Session. In addition, according to an embodiment of the disclosure, it may refer to an ESZI that the UE 101 should include when performing a DNS query. Alternatively, it may refer to an ESZI to be used when the UE 101 identifies information received as the DNS response. PCF 113 may determine an ESZI that may refer to an edge data network, edge computing environment, or edge computing resource closest to or suitable for the current location of the UE 101 by considering the location of the UE 101 received from the SMF 112 when determining the ESZI that the UE 101 may use to perform the DNS procedure for the corresponding PDU session. As another example, when determining an edge computing environment or an edge data network that may be accessed and used from the current location of the UE 101, the PCF 113 may select the ESZI that may refer to the resource closest to the current location (or the UE may use at its current location) of the UE 101 among edge computing environment or an edge data network that does not have a severe load in consideration of the load state of the network and transmit the same to the SMF 112.

In order to update the ESZI according to the location of the UE 101, the PCF 113 may subscribe to the SMF 112 for an event related to the location change of the UE 101. When the PCF 113 subscribes to the location change event of the UE 101 to the SMF 112, the PCF 113 may configure and request an Area of Interest (AoI—e.g., an area where the mobility of the UE needs to be determined), which may be composed of a tracking area list or a cell list. When determining the Area of Interest, the PCF 113 may determine the AoI in consideration of area information that may be covered by the edge network available in the current area of the UE 101. For example, when the UE 101 leaves a specific area corresponding to the AoI, the PCF may configure the UE to give a report on the event, and at that time, may interact with the SMF 112 to determine the location of the UE 101 again and provide the ESZI thereof to the UE 101.

When providing ESZI information, the PCF 113 may configure a mapping for which ESZI should be used in which area and transmit the mapping to the SMF 112. For example, ESZI for use in tracking area 1, tracking area 2, tracking area 3, and tracking area 4 and ESZI for access in tracking area 10, tracking area 11, and tracking area 12 may be listed and forwarded to SMF 112. Upon receiving this, the SMF 112 may later determine (or identify) mobility of the UE 101 and determine (or identify) that ESZI to be used in the area where the UE 101 is currently located should be updated to the UE 101. According to another embodiment of the disclosure, the SMF 112 may transmit the received ESZI and location information list to the UE 101 at once, and the UE 101 that received the ESZI and location information list may determine the ESZI according to its current location and use the same for DNS query.

The PCF 113 may deliver the PCC rule to be applied by the SMF 112 for the PDU session that the UE 101 intends to use. The information proposed in the above embodiment may be included as a part of the PCC rule, and may be separately configured and delivered as information for the MEC service in addition to the PCC rule. The PCF 113 may include a traffic detection rule, traffic forwarding rule, or a list of information (e.g., data network access indentity (DNAI) that may identify the UPF that must be allocated to establish the corresponding PDU session required to provide MEC service in the corresponding PDU Session when configuring the PCC rule. After receiving this information, the SMF 112 may select a UPF based on this information and apply the UPF when transmitting a session establishment request to the UPF.

In step 205, the SMF 112 performs a UPF selection procedure based on the policy information received from the PCF 113 and performs an N4 session establishment procedure with the selected UPF 122. Upon receiving the DNAI list from the PCF 113, the SMF 112 may select a UPF corresponding to the DNAI that may be connected based on the current location of the UE 101. If the information received from the PCF 113 includes the ESZI, the SMF 112 may select a UPF capable of supporting the corresponding service area based on the current location of the UE 101.

When selecting the UPF, the SMF 112 determines (or identifies) whether the UPF is a UPF that may be connected to the edge data network to which the PDU session requested by the UE 101 is connected, and selects a UPF that may be connected to the corresponding edge data network. In addition, the SMF 112 performs the N4 session establishment procedure including delivering DNAI and packet forwarding action rule, and packet enforcement rule to the UPF 122 to enable data transmission and reception through the edge network.

In the SMF 112, an ESZI for each location, an ESZI for each UPF service area, or an ESZI for each SMF service area may be pre-configured. The SMF 112 may view the current location of the UE 101 and search for the ESZI for the location. After identifying the appropriate UPF for the current location of the UE 101, or after identifying the UPF service area, the SMF 112 may identify the DNS server address to which the UPF may be connected. According to another embodiment of the disclosure, it is possible to identify an edge computing environment or edge computing resource to which the UPF may be connected, or an ESZI that may represent a specific IP domain of an edge data network. The SMF 112 may obtain the ESZI information from the NRF (not illustrated in FIGS. 1 and 2) during the UPF selection process among the user plane path establishment procedure (including a procedure of adding ULCL UPF or BP UPF) or from the UPF during the N4 session establishment procedure.

In step 206, the SMF 112 may configure a PCO to be provided to the UE 101 based on the session-related policy information received from the PCF 113. According to another embodiment of the disclosure, the SMF 112 may configure the PCO to be provided to the UE based on an internally pre-configured value. The SMF 112 may be configured to include the ESZI determined from step 204 or step 205 in the PCO. The PCO is the abbreviation of protocol configuration options, which is a container containing additional configuration information necessary to use the corresponding PDU session, and is information exchanged between the UE 101 and the SMF 112.

If the SMF 112 determines the paired list of the ESZI and the area (e.g., tracking area list and cell list) in which the value is available according to step 204 or 205, the SMF 112 may include this list in the PCO and deliver the list to the UE. Alternatively, after the SMF 112 determines the paired list of the ESZI and the area (e.g., tracking area list and cell list) in which the value is available according to step 204 or 205, the SMF 112 may configure the ESZI for the current location of the UE 101 as a PCO and transmit the PCO to the UE 101. Later, when the UE 101 moves to another location, the SMF 112 may determine (or identify) an ESZI suitable for the changed location, and may determine to deliver the ESZI to the UE 101. Specific details thereof will be described in the embodiment according to FIG. 3 to be described later.

In step 207, the SMF 112 configures a session management NAS message called PDU session establishment accept, and includes the PCO in this message. This PCO may include an ESZI value according to step 206.

In step 208, the SMF 112 may transmit the PDU session establish accept message delivered to the UE 101 and the N2 message delivered to the base station by including the same in the Namf_Communication_N1N2messageTransfer message to the AMF 111. The N2 message may include a PDU session ID, a QoS profile, a QoS flow ID, tunnel information on the UPF side for N3 tunnel connection between the UPF and the base station, and the like.

The AMF 111 may transmit the ACK for Namf_Communication_N1N2messageTransfer to the SMF 112.

In step 209, the AMF 111 may transfer the message received from the SMF 112 to the base station 121. This message may include the N2 SM message received from the SMF 112, and the N1 SM NAS message received from the SMF 112.

In step 210, the base station 121 may receive the message in step 209 and perform an RRC signaling procedure for establishing a data radio bearer with the UE according to QoS information contained in the N2 SM message. In addition, the base station 121 may transmit the received NAS message to the UE 101.

Upon receiving the PDU session establishment accept message delivered by the SMF 112 through the step 210, the UE 101 may complete the PDU session establishment procedure. The UE 101 may identify the PCO information included in the PDU session establishment accept message, and may identify the DNS server address and ESZI included in the PCO. Through this information, the UE 101 may recognize which DNS server to connect to for the corresponding PDU Session, and may determine (or identify) that the ESZI should be included as a zone ID in the DNS query to be delivered.

In step 211, the base station 121 may transmit a response to step 209 to the AMF 111. This message includes the N2 SM message which includes the PDU session ID and tunnel information on the base station side for N3 tunnel connection with the UPF. In addition, information such as established QoS flow may be included.

In step 212, the AMF 111 receiving the message of step 211 may deliver the N2 SM message contained in the message of step 211 to the SMF 112.

In step 213, the SMF 112 may view the N2 SM message received in step 212 and perform an N4 session modification procedure with the UPF 122. In this case, the SMF 112 may deliver the N3 tunnel information of the base station side received from the base station 121 to the UPF 122, and may also deliver a packet forwarding rule for the N3 tunnel information. Through this step, it may be considered that a tunnel connection for data transmission/reception is established between the UPF 122 and the base station 121.

In step 214, the SMF 112 may transmit a response to step 210 to the AMF 111.

Now, the UE 101 may transmit and receive data through the established PDU Session.

In step 215, after identifying the information received in step 210, the NAS layer (not shown in FIGS. 1 and 2) of the UE 101 may transmit the DNS server address and the ESZI to the upper layer through the AT command. The AT command is a command transmission method between the 3GPP communication layer and the upper layer (for example, including an application layer and an enabling layer according to the structure of the disclosure), and may refer to an operation of notifying the upper layer of information necessary for using the network. When the upper layer that has received the DNS server address and the ESZI requests a DNS query from the DNS resolver (not shown in FIGS. 1 and 2), the upper layer may include the DNS server address and the ESZI and deliver them.

According to another embodiment of the disclosure, the upper layer may configure the DNS server address and ESZI information to the DNS resolver by transferring the DNS server address and the ESZI information to the DNS resolver. When performing a DNS query, the DNS resolver may determine whether to include the ESZI information. Alternatively, after receiving the DNS response to the DNS query, the DNS resolver may identify the IP address list of the application server included in the DNS response and additional DNS resource record information, and select an IP address with resource record information matching the ESZI information.

According to another embodiment of the disclosure, if the information received in step 210 includes a list (TA list, or cell list) of ESZI and location information in which the ESZI is valid, the NAS layer of the UE 101 may determine an ESZI corresponding to the current location of the UE 101 and transmit the ESZI information to the upper layer. According to another embodiment of the disclosure, the NAS layer of the UE 101 may transfer the ESZI and the list of valid location information to the upper layer, and after receiving the list, the upper layer may determine the ESZI suitable for the current location of the UE 101 and perform a DNS procedure using the same.

In step 216, when a DNS resolution request for the FQDN is received from the application layer (not shown in FIGS. 1 and 2), the UE 101 may generate a DNS query for the corresponding FQDN and transmit the DNS query to the DNS server 161. In this case, the UE 101 may determine the ESZI for the current location and include the ESZI in the DNS query to transmit the determined ESZI.

In step 217, the DNS server receiving the DNS query delivered by the UE 101 may determine which edge computing environment or application server address that is running on the edge computing resource should be returned to the UE based the ESZI information included in the DNS query.

In step 217, or when configuring a DNS response for providing a DNS record of the DNS server 161 to the UE 101, the DNS server 161 may further include a resource record corresponding to the ESZI. For example, when the DNS server 161 identifies the DNS record for "edgecomputing.example.net", the DNS server 161 may identify the corresponding IP address and the value "edge_computing_service" as the resource record for the IP address. Accordingly, the DNS server 161 may configure (or generate) a DNS response including "edge_computing_service" in the resource record corresponding to the ESZI and provide the DNS response to the UE.

In step 218, the DNS server 161 transmits the IP address of the edge application server determined based on the ESZI information in step 217 to the UE. Now, the UE 101 may transmit data to the corresponding IP address.

As another method, in step 218, the DNS server 161 may configure the IP address of the application server and an additional resource record (e.g., DNS SRV, DNS LOC, DNS TXT, etc.) thereof in the DNS response and transmit the same to the UE 101. In this case, the UE 101 receiving the DNS response may identify additional resource record information included in the DNS response and identify whether it has the same value as the ESZI. In a case where the DNS response includes a list consisting of multiple IP addresses and a resource record, the UE 101 may select the IP address of the application server for the resource record indicating the same value based on the value for the ESZI information available at the current location. The UE 101 may determine (identify) the IP address having the information mapped to the ESZI obtained from the 5G system as the most suitable IP address that may be used for the edge computing service at the current location of the UE 101.

Figure 3:
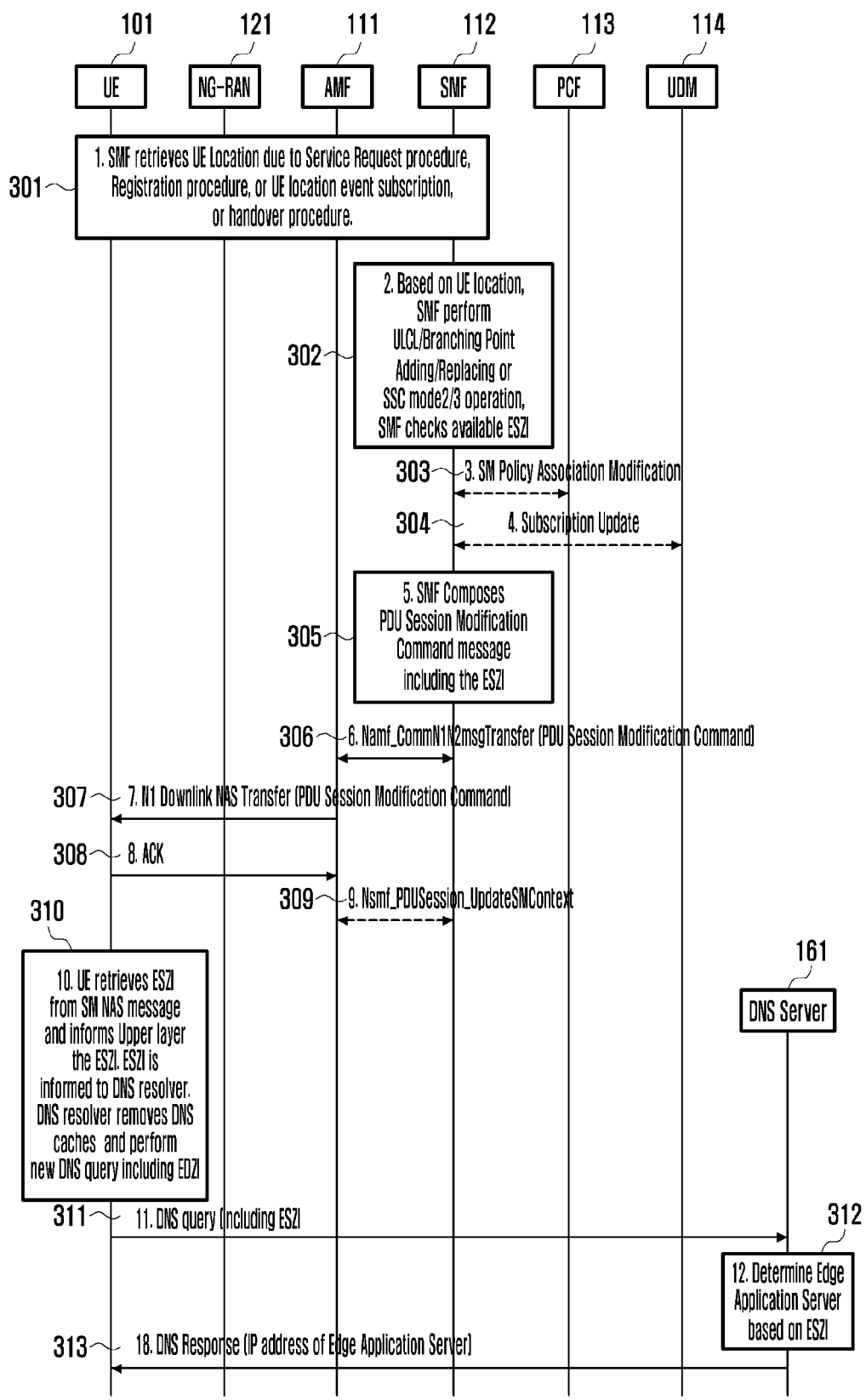
FIG. 3 is a diagram illustrating a procedure providing ESZI information that a UE should use in a DNS procedure to search for an appropriate edge application server to the UE according to mobility of the UE or a change in information in a network according to an embodiment of the disclosure.

FIG. 3 is a diagram illustrating a procedure providing ESZI information that a UE should use in a DNS procedure to search for an appropriate edge application server to the UE according to mobility of the UE or a change in information in a network according to an embodiment of the disclosure.

Through the procedure of FIG. 3, the SMF 112 may deliver the updated ESZI to the UE 101 according to the location of the UE 101. The ESZI may be included in the ePCO or may be included in NAS information for session management and delivered to the UE 101. In addition, each NF illustrated in FIG. 3 is for convenience of understanding, and if a separate specific NF performing the function described in the disclosure is applied, each NF illustrated in FIG. 3, for example, the new NF may perform functions described below instead of each NF illustrated in FIG. 3, for example, at least one NF among AMF, SMF, and PCF.

The SMF 112 obtains the subscription information of the UE 101 from the UDM 114 through the PDU session establishment procedure, and may identify whether the UE 101 is a UE capable of using the edge computing service through an identifier included in the subscription information. The SMF 112 may store the same in the UE context and determine (or identify) the corresponding UE 101 to perform an operation for the edge computing service.

In step 301, the UE 101 may perform a service request or a registration request according to mobility. The UE 101 may respond with the service request when there is data to be delivered or the AMF 111 paging the UE 101. According to another embodiment of the disclosure, when the UE 101 is moving in the IDLE state and leaves the registration area allocated from the AMF 111, the UE may perform a registration request to receive a new registration area allocated. When the UE 101 moves in the connected state, the base station 121 performs a handover procedure. When the base station serving the UE 101 is changed to a new base station through the handover, the corresponding base station may perform a path switch (in the case of Xn-based handover, which is an interface between base stations) or handover notify (in the case of handover through the AMF 111). According to the above procedure, the AMF 111 may identify the location of the UE 101. When the UE 101 requests or the base station 121 transmits an N2 SM message, the AMF 111 transmits the message to the SMF 112 and, in this case, may include location information (cell ID or tracking area ID) of the UE 101. Alternatively, if the SMF 112 subscribes to the event for the location information of the UE 101, the AMF 111 may notify the SMF 112 of the current location of the UE 101 through the Event_Notify operation.

In step 302, the SMF 112 that has obtained the location of the UE 101 according to step 301 may perform the operation of step 302 as follows.

The SMF 112 determined that the location of the UE 101 has been changed may newly allocate a PSA UPF or a local PSA UPF that may access an edge data network suitable for the current location of the UE 101, thereby making a decision to insert or replace the ULCL UPF, or insert or replace (in the case of using IPv6) the BP UPF. According to another embodiment of the disclosure, the SMF 112 may determine to modify the PDU session when changing the PSA UPF according to SSC mode 2/3. The SMF 112 performs a procedure of identifying the address of the DNS server and the ESZI that the UE may use for the MEC service at the current location. The SMF 112 may identify the ESZI in one or more of the following ways.

In the SMF 112, ESZI for each location or ESZI for each service area may be pre-configured. The SMF 112 may view the current location of the UE 101 and search for the ESZI for the corresponding location.

After identifying the UPF for the location of the UE 101 or after identifying the UPF service area, the SMF 112 may identify the edge computing environment or edge computing resource to which the UPF may be connected, and may identify the ESZI for the edge computing environment or edge computing resource. Alternatively, the edge data network to which the corresponding UPF may be connected may be identified, and the ESZI for the edge data network may be identified. The SMF 112 may obtain the information from the NRF (not shown in FIGS. 1 to 3) during the UPF selection process among the user plane path change procedure (a procedures for adding/changing ULCL UPF or BP UPF) or from the UPF during the N4 session establishment procedure.

The SMF 112 obtains the subscription information of the UE 101 from the UDM 114 through the PDU session establishment procedure, and may identify whether the UE 101 is a UE capable of using the edge computing service through an identifier included in the subscription information. The SMF 112 may store the same in the UE context and determine (or identify) the corresponding UE 101 to perform an operation for the edge computing service.

In step 301, the UE 101 may perform a service request or a registration request according to mobility. The UE 101 may respond with the service request when there is data to be delivered or the AMF 111 paging the UE 101. According to another embodiment of the disclosure, when the UE 101 is moving in the IDLE state and leaves the registration area allocated from the AMF 111, the UE may perform a registration request to receive a new registration area allocated. When the UE 101 moves in the connected state, the base station 121 performs a handover procedure. When the base station serving the UE 101 is changed to a new base station through the handover, the corresponding base station may perform a path switch (in the case of Xn-based handover, which is an interface between base stations) or handover notify (in the case of handover through the AMF 111). According to the above procedure, the AMF 111 may identify the location of the UE 101. When the UE 101 requests or the base station 121 transmits an N2 SM message, the AMF 111 transmits the message to the SMF 112 and, in this case, may include location information (cell ID or tracking area ID) of the UE 101. Alternatively, if the SMF 112 subscribes to the event for the location information of the UE 101, the AMF 111 may notify the SMF 112 of the current location of the UE 101 through the Event_Notify operation.

In step 302, the SMF 112 that has obtained the location of the UE 101 according to step 301 may perform the operation of step 302 as follows.

The SMF 112 determined that the location of the UE 101 has been changed may newly allocate a PSA UPF or a local PSA UPF that may access an edge data network suitable for the current location of the UE 101, thereby making a decision to insert or replace the ULCL UPF, or insert or replace (in the case of using IPv6) the BP UPF. According to another embodiment of the disclosure, the SMF 112 may determine to modify the PDU session when changing the PSA UPF according to SSC mode 2/3. The SMF 112 performs a procedure of identifying the address of the DNS server and the ESZI that the UE may use for the MEC service at the current location. The SMF 112 may identify the ESZI in one or more of the following ways.

In the SMF 112, ESZI for each location or ESZI for each service area may be pre-configured. The SMF 112 may view the current location of the UE 101 and search for the ESZI for the corresponding location.

After identifying the UPF for the location of the UE 101 or after identifying the UPF service area, the SMF 112 may identify the edge computing environment or edge computing resource to which the UPF may be connected, and may identify the ESZI for the edge computing environment or edge computing resource. Alternatively, the edge data network to which the corresponding UPF may be connected may be identified, and the ESZI for the edge data network may be identified. The SMF 112 may obtain the information from the NRF (not shown in FIGS. 1 to 3) during the UPF selection process among the user plane path change procedure (a procedures for adding/changing ULCL UPF or BP UPF) or from the UPF during the N4 session establishment procedure.

In step 305, according to the above procedure, the SMF 112 determined (or identified) an ESZI capable of identifying an edge computing environment, an edge computing resource, or an IP domain of the edge data network to be used by the UE 101 with respect to the current location of the UE 101 and an UPF providing data communication to the UE 101 and a data network therefor. The SMF 112 may configure an SM NAS message called PDU session modification command to deliver the ESZI to the UE 101. The SMF 112 may include the ESZI in the ePCO of the PDU session modification command. According to another embodiment of the disclosure, the ESZI may be included as one of the NAS information elements. The ESZI may be included later when the UE 101 transmits a query to the DNS server. Alternatively, the ESZI may be used later when the UE 101 determines an IP address matching the ESZI from among the responses received from the DNS server.

As another embodiment, it is obvious that SMF 112 may use another SM NAS message instead of a PDU session modification command message, and if the ESZI is notified through the corresponding SM NAS message, it is not limited to the name and may refer to a message corresponding to the operation proposed in the disclosure.

In step 306, the SMF 112 may transmit the Namf_Communication_N1N2messageTransfer message to the AMF 111 including the above message. The AMF 111 may transmit the ACK for the Namf_Communication_N1N2messageTransfer to the SMF 112.

In step 307, the AMF 111 may transmit the message received from the SMF 112 to the UE 101 through the base station 121. The message transmitted from the AMF 111 to the base station 121 includes the N1 SM NAS message received from the SMF 112. This message may not include the N2 SM message, because the base station 121 does not have an operation to perform in relation to the session management. If the SMF 112 performs an operation according to the SSC mode 2/3, the N2 SM message may be included and transmitted to the base station 121, and the base station 121 may perform an operation accordingly.

The base station 121 may transmit the N1 SM NAS message received from the AMF 111 to the UE 101. The UE 101 may identify the N1 SM NAS message received from the SMF 112 and identify the PCO or ePCO included in the message. The UE 101 identifies the ESZI included in the PCO. The UE 101 may configure the PDU session modification complete message indicating completion of the PDU session modification procedure as an N1 SM NAS message according to step 308 and send the same to the AMF 111.

Upon receiving the message, the AMF 111 may transmit the N1 SM NAS message to the SMF 112 in step 309.

In step 310, the NAS layer (not shown in FIGS. 1 to 3) of the UE 101 received the N1 SM NAS message may transmit the updated ESZI to the upper layer, and the upper layer may transmit and configure the updated ESZI to the DNS Resolver (not shown in FIGS. 1 to 3). Alternatively, the upper layer may transmit the corresponding ESZI when requesting a DNS query to the DNS resolver. After receiving the updated ESZI, the DNS resolver of the UE 101 that has received the ESZI may delete all of the cached server access information and determine to perform a new DNS query. In other words, because the DNS resolver needs to connect to the edge computing environment, which is identified by the ESZI, the edge computing resource, or the edge application server, which runs on the edge data network, it is necessary to identify the IP address of the application server newly without using the existing application server IP address.

In step 311, according to the determination in step 310, the UE 101 may transmit the DNS query to the DNS server 161 including the FQDN and ESZI indicating the application server. Alternatively, in step 311, the UE 101 may transmit the DNS query including only the FQDN.

In step 312, the DNS server 161 that has received the DNS query transmitted from the UE 101 may determine which edge computing environment or application server running on the edge computing resource should be returned to the UE 101 based on ESZI information included in the DNS query.

Alternatively, in step 312, when configuring the DNS record of the DNS server 161 as a DNS response to be provided to the UE 101, the DNS server 161 may further include a resource record corresponding to the ESZI. For example, when identifying the DNS record for "edgecomputing.example.net", the DNS server may identify the value of "edge_computing_service" with the corresponding IP address and the resource record for the IP address. Accordingly, the DNS server 161 may configure (or generate) an "edge_computing_service" in a resource record corresponding to an ESZI as a DNS response and provide the DNS response to the UE 101.

In step 313, the DNS server 161 may transmit the IP address of the edge application server determined based on the ESZI information to the UE 101. Now, the UE 101 may transmit data to the corresponding IP address.

Alternatively, in step 313, in a case where the DNS server 161 configures the IP address of the application server and an additional resource record (e.g., DNS SRV, DNS LOC, DNS TXT, etc.) for the DNS response together and transmits it to the UE 101, upon receiving this, the UE 101 may determine (or identify) whether the received data has the same value as the ESZI the UE owns based on the additional resource record information. If the DNS response includes a list of multiple IP addresses and resource records, the UE 101 may select the IP address of the application server for the resource record representing the same value based on the value for ESZI information available at the current location. The UE 101 may determine that the IP address having information mapped to the ESZI obtained from the 5G system is the most suitable IP address that may be used for the edge computing service at the current location of the UE 101.

As another detailed embodiment of FIG. 3, when the ESZI is configured and provided to the UE 101, the SMF 112 may configure the ESZI as a list configured as a pair with area information (TA list or cell list) in which the corresponding ESZI is valid and provide the list to the UE 101.

That is, the SMF 112 may be configured as a 'specific area information—ESZI' pair and provided to the UE 101. The specific area information may be a tracking area ID or a cell ID, and may be a list of tracking area IDs or a list of cell IDs. The 'specific area information—ESZI' pair may be configured as a list including at least one pair and provided to the UE. The UE 101 receiving this may view and identify the received list when determining which ESZI should be used in a DNS query at which location. The NAS layer (not shown in FIGS. 1 to 3) of the UE 101 determines the current location of the UE 101, obtains the ESZI corresponding to the current location from the list, and transmits the ESZI to the upper layer, and the upper layer deliver the updated ESZI to the DNS Resolver. After receiving the updated ESZI, the DNS resolver of the UE 101 that has received the ESZI may delete all of the cached server access information and determine to perform a new DNS query. In other words, because the DNS resolver needs to connect to the edge application server, which runs on the edge data network, it is necessary to identify the IP address of the application server newly without using the existing application server IP address.

According to the above-described embodiment of the disclosure, because the UE 101 may determine itself based on the list provided from the SMF 112 and change the ESZI, signaling between the SMF 112 and the UE 101 may be reduced. However, there is also a part that the UE 101 may obtain deployment information on the mobile communication network and the corresponding edge computing environment or edge computing resource. Accordingly, providing ESZI and information on a specific area as a list to the UE 101, and informing the ESZI from time to time according to the location of the UE 101 may be determined and operated according to the policy of the mobile network operator.

Figure 4:
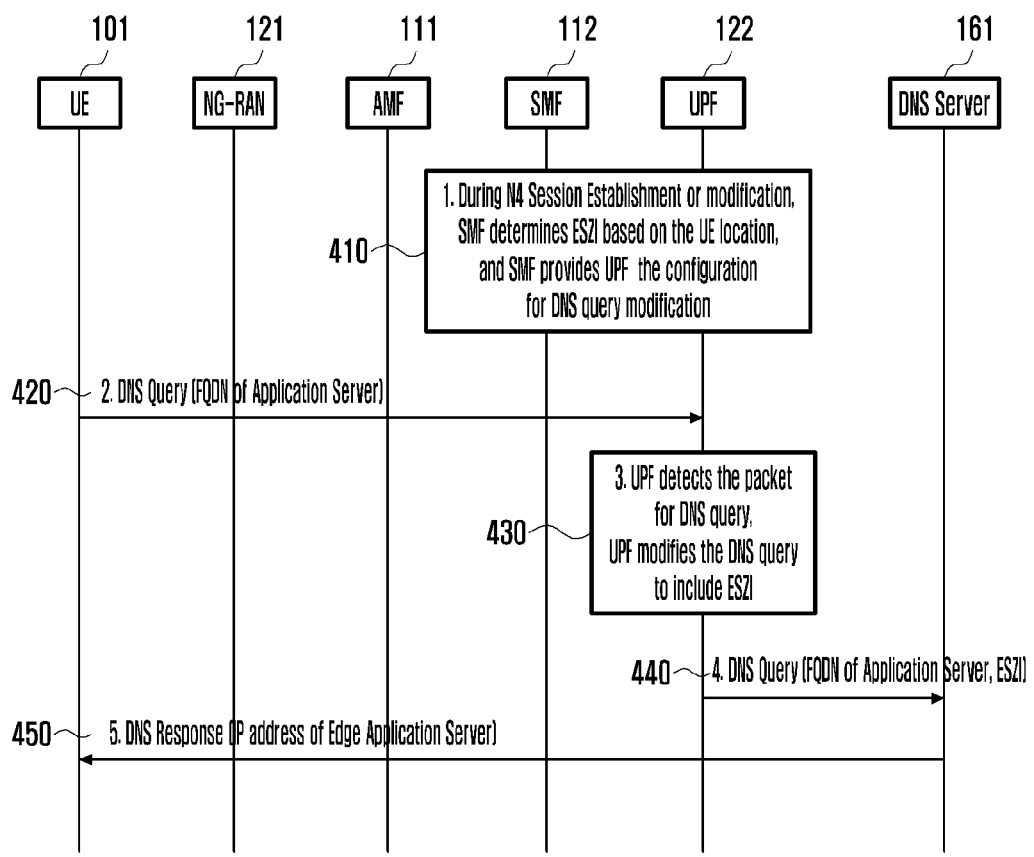
FIG. 4 is a diagram illustrating a procedure transmitting a DNS query including an ESZI to a DNS server in a 5G system and providing an address of an edge application server most suitable for a location of a UE in the DNS server when the UE according to a second embodiment of the disclosure transmits the DNS query.

FIG. 4 is a diagram illustrating a procedure for UPF to detect a DNS query transmitted from the UE, and to include the ESZI in the DNS query transmitted from the UE and forward the ESZI to the DNS server.

According to the overall operation of FIG. 4, the DNS server 161 may determine the edge computing environment, edge computing resource, or edge data network corresponding to the ESZI, and may determine the address of the application server driven thereon, and deliver the address to the UE as a DNS response. In addition, each of the NFs illustrated in FIG. 4 is for convenience of understanding, and if a separate specific NF performing the function described in the disclosure is applied, a new NF may perform a function described below instead of each NF illustrated in FIG. 4, for example, at least one NF among AMF, SMF, and UPF.

This embodiment is a method of reflecting the deployment of the network (i.e., applying ESZI to DNS queries) by modifying a DNS query to a 5G system without the influence of a UE, and has the advantage of not requiring a change of the UE.

In step 410, the SMF 112 obtains the subscription information of the UE 101 from the UDM (not illustrated in FIG. 4) through the PDU session establishment procedure, and may identify whether the UE 101 is a UE capable of using the edge computing service through an identifier included in the subscription information. The SMF 112 may store the same in the UE context and determine (or identify) the corresponding UE 101 to perform an operation for the edge computing service. Accordingly, the SMF 112 may determine to apply the function of modifying the DNS query delivered by the UE. That is, the SMF 112 may determine whether to apply the ESZI to the DNS query delivered by the UE.

According to another embodiment of the disclosure, the SMF 112 may receive a policy (not shown in FIG. 4) from the PCF (not shown in FIG. 4) that a change procedure including an ESZI is required in the DNS query to provide an edge computing service to the corresponding UE through the SM policy establishment procedure (not shown in FIG. 4). In addition, the PCF may transmit information necessary for DNS query modification, that is, ESZI, to the SMF 112 (not shown in FIG. 4). Additionally, the PCF may configure a pair of ESZIs for a specific area and transmit the pair of ESZIs to the SMF 112 as a list (not shown in FIG. 4). For example, by configuring the tracking area list and the ESZI as a pair, the list consisting of at least one pair may be transmitted to the SMF 112.

According to another embodiment of the disclosure, the SMF 112 may determine (or identify) to apply the DNS query modification function to the UE using the edge computing service according to the internal configuration or the network configuration (configuration from OAM (not shown in FIG. 4) or information pre-configured to the SMF by the operator itself). In the internal configuration, the ESZI to be used when changing the DNS query is configured according to the location of the UE. For example, information on which ESZI should be used in which tracking area may be composed of pairs. In addition, a list consisting of at least one pair by configuring the tracking area list and the ESZI as a pair may be configured in the SMF 112.

The SMF 112 may establish an N4 session with the UPF 122 or change the N4 session through a PDU session establishment procedure or a PDU session change procedure. In this case, if the SMF 112 determines to apply the DNS query change function to the corresponding UE 101 as described above, the SMF 112 may provide information for applying the DNS query change function to the UPF 122. That is, the SMF 112 may configure a detection rule (e.g., a rule that detects a packet with the DNS server's IP address as the Target IP address, or that uses the DNS server's IP address as the Target IP address and verifies that the port number is the IP port number for DNS queries.) in the UPF 122 for detecting a DNS query packet transmitted from the UE 101 to the DNS server 161. In addition, SMF 112 configures a rule in the UPF 122 to perform an operation of including ESZI in an area corresponding to the zone ID of a corresponding DNS query with respect to the DNS query packet found when the detect rule is applied to the UPF 122. That is, the SMF 112 transmits the ESZI value to be included in the DNS query to the UPF 122 and also configures the packet area (e.g., 16 octect to 20 octect) in which the ESZI should be included in the UPF 122.

In step 420, the UE 101 transmits a DNS query to search for the IP address of the application server corresponding to the FQDN to which the application client wants to deliver data according to the request of the application client (not shown in FIG. 4) included in the UE. The UE 101 may transmit the DNS query by using the IP address of the DNS server received from the SMF as the target IP address during the PDU session establishment or PDU session change procedure.

In step 430, the UPF 122 may detect a packet for the DNS query delivered by the UE 101 according to the detection rule configured by the SMF 112 according to step 410. Thereafter, the UPF 122 may perform an operation of changing the DNS query delivered by the UE 101 according to the modification rule configured by the SMF 112. That is, the ESZI configured by the SMF may be included in the area corresponding to the zone ID of the DNS query.

In step 440, the UPF 122 may include the ESZI in the DNS query delivered by the UE, and then transmit the ESZI to the DNS server 161. Upon receiving the ESZI, the DNS server 161 may determine which edge computing environment or application server running on the edge computing resource should be returned to the UE 101 by viewing the ESZI included in the DNS query.

In step 450, the DNS server 161 may transmit the IP address of the edge application server determined based on the ESZI information determined in step 217 of FIG. 2 to the UE 101. Now, the UE 101 may transmit data to the corresponding IP address.

Figure 5:
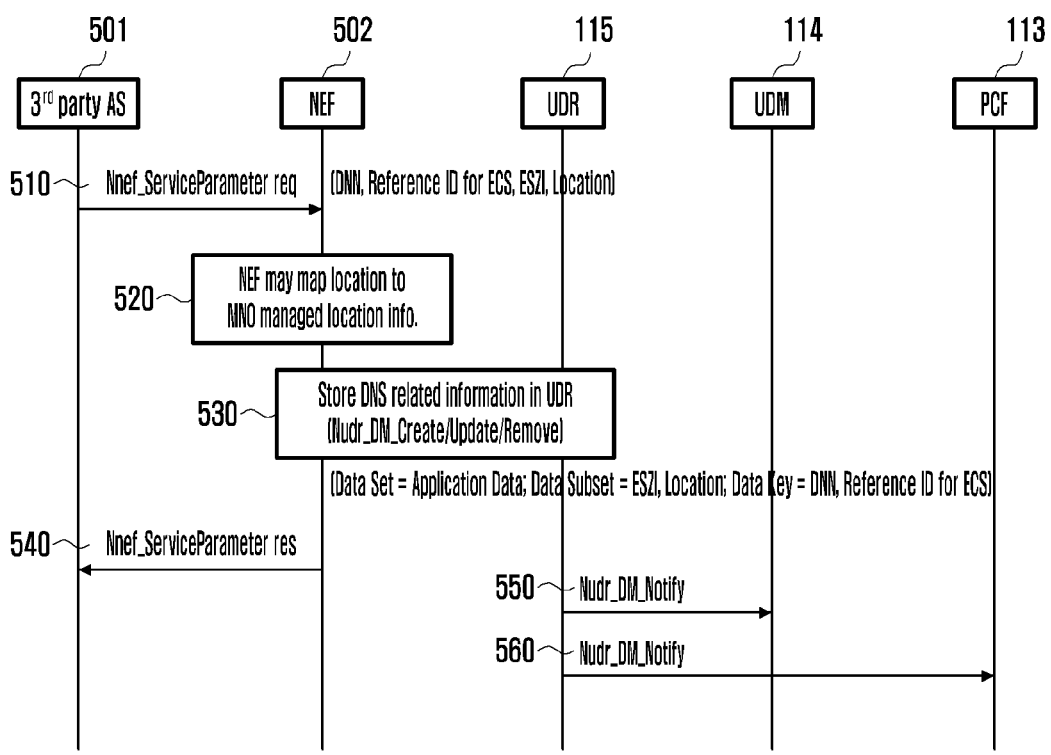
FIG. 5 is a diagram illustrating a procedure providing an ESZI generated for a 3rd party providing cloud services and edge computing services to identify the edge computing environment managed by the 3rd party itself to a 5G system according to the disclosure.

FIG. 5 illustrates a procedure in which a 3rd party providing a cloud service and an edge computing service provides ESZI information that a UE needs to access to search for an edge application server using its service and location information corresponding thereto to a 5G system according to the disclosure.

Each of the NFs illustrated in FIG. 5 is for convenience of understanding, and if a separate specific NF performing the function described in the disclosure is applied, a new NF may perform a function described below instead of each NF illustrated in FIG. 4, for example, at least one NF among AS, NEF, UDR, UDM, and PCF.

The 3rd party cloud service provider (hereafter referred to as the 3rd CSP) may decide to provide the MNO's mobile communication system with the ESZI corresponding to the zone ID from which the IP address of the application server running on its edge computing environment may be found. This allows the 3rd CSP to contract with the MNO to build their edge computing service environment on the MNO's infrastructure in a specific area, and allow the UE to use the edge application server running in the environment. This is an edge computing system that is configured based on a contract between the MNO and the 3rd CSP, and the UE is not aware of it. In order for the UE to use the Edge Computing Environment of the 3rd CSP running in a specific area, the MNO should allow the UE to search for the address of the edge application server running on the edge computing environment of the 3rd CSP when the UE searches for the address of the application server. To this end, the 5GS needs to provide the UE with an ESZI that may search for the Edge Application Server address that operates in the environment of the 3rd CSP. FIG. 5 proposes a method for the 3rd CSP to provide the MNO with information on which ESZI the UE using edge computing should use to transmit the DNS query in the corresponding area.

In step 510, the AS 501 of the 3rd CSP may provide the parameters for the service to the UDR 115 by using the NEF service. If the 3rd CSP may directly access the UDR 115, the 3rd CSP may use the UDR service instead of the NEF service (Nudr).

According to step 510, the 3rd CSP provides DNS server-related information to the NEF 502. To this end, information may be delivered using the Nnef service. In the embodiment, it is proposed to use the Nnef_ServiceParameter Ceate/Modify operation, but it may refer to an operation of transferring DNS server-related information with another name and through NEF. The 3rd CSP may include the following parameters in this message.

DNN: Data network name refers to a name that identifies a data network that may use edge computing services provided by 3rd CSP or that may be accessed by the edge computing environment provided by 3rd CSP. The 3rd CSP may define this DNN when contracting service with MNO, and may identify edge computing service or 3rd CSP through the DNN.

Reference ID for edge computing service: An ID that may identify the relationship between the MNO and the 3rd CSP, and may be a value defined in the service contract. The 3rd CSP's application server using this identifier and 5GS may identify each other. That is, it is possible to identify which 3rd CSP it refers to, which server of the 3rd CSP it refers to, or which edge computing environment 3rd CSP it refers to.

ESZI: 3rd CSP may include an ESZI that may identify edge computing environment, edge computing resource, or edge data network for edge computing services. The 3rd CSP may include the ESZI to inform information identifying which edge computing environment, edge computing resource, or edge data network to use for the edge computing service provider identified by the DNN or reference ID for the edge computing service. The ESZI may be delivered together with the following location information.

Location information: If the 3rd CSP separately operates the edge computing environment for a specific area, and also operates resources for each area to search for the address of the edge application server running within the edge computing environment, the location information is provided together with the ESZI. The location information may have a form of civic address (e.g., street name address, building address, city/county/district, etc.) or GPS information (e.g., a specific GPS range value), a zip code (postal ZIP code), or a tracking area ID or a cell ID.

The DNS server address and location information may be configured as a pair of matching information, and may be configured as a list including at least one pair and delivered to the NEF 502.

In step 520, if the NEF 502 receives location information from the 3rd CSP together, the NEF 502 may perform an operation of mapping the corresponding location information to a tracking area ID or cell ID, which is a location information format understandable in 3GPP.

In step 530, the NEF 502 may store the information received according to step 510 and additionally mapped location information according to step 520 in the UDR 115 (using Nudr_DM_Create/Update service operation). This message may include the following information.

Data Set=Application Data or Policy; Identifier indicating that the information provided by the 3rd CSP is categorized. This may distinguish whether the information is application data or policy data.

Data Subset=ESZI, Location; A pair of ESZI and corresponding local information provided by the 3rd CSP (information mapped by the NEF 502 or in the form of local information understandable by the MNO, and may be composed of a list). Data Subset may have a plurality of sets. For example, the ESZI may be included in a list including at least one pair of areal information corresponding to the ESZI.

Data Key=DNN, Reference ID for ECS; An identifier that may identify the 3rd CSP, an identifier that may identify the edge computing service provided by the 3rd CSP, or an identifier that may identify the edge computing service of a specific area provided by the 3rd CSP.

The UDR 115 stores the information in application data or policy data. Accordingly, the UDR 115 stores information on which ESZI should be used in which area, in which edge computing service area, or for which 3rd CSP, and may inform the UDM 114 or PCF 113 of this information.

In step 540, after providing the information to the UDR 115, the NEF 502 may transmit a response to the 3rd CSP to inform that the Nnef_ServiceParameter procedure has been successfully performed.

In step 550, the UDR 115 may transmit the updated information, that is, the ESZI to the UDM 114. Upon receiving this information, the UDM 114 may store this information in session management related information and deliver the same to the SMF (not shown in FIG. 5). It may be utilized when performing an operation according to an embodiment of the disclosure.

In step 560, the UDR 115 may transmit the updated information, that is, the ESZI to the PCF 113. Upon receiving this information, the PCF 1113 may store this information in session management related information and deliver the same to the SMF. It may be utilized when performing an operation according to an embodiment of the disclosure.

As another embodiment of the disclosure, a network structure for how to utilize the application layer server and operations of the UE and the application layer server in the corresponding network structure will be described.

Figure 6:
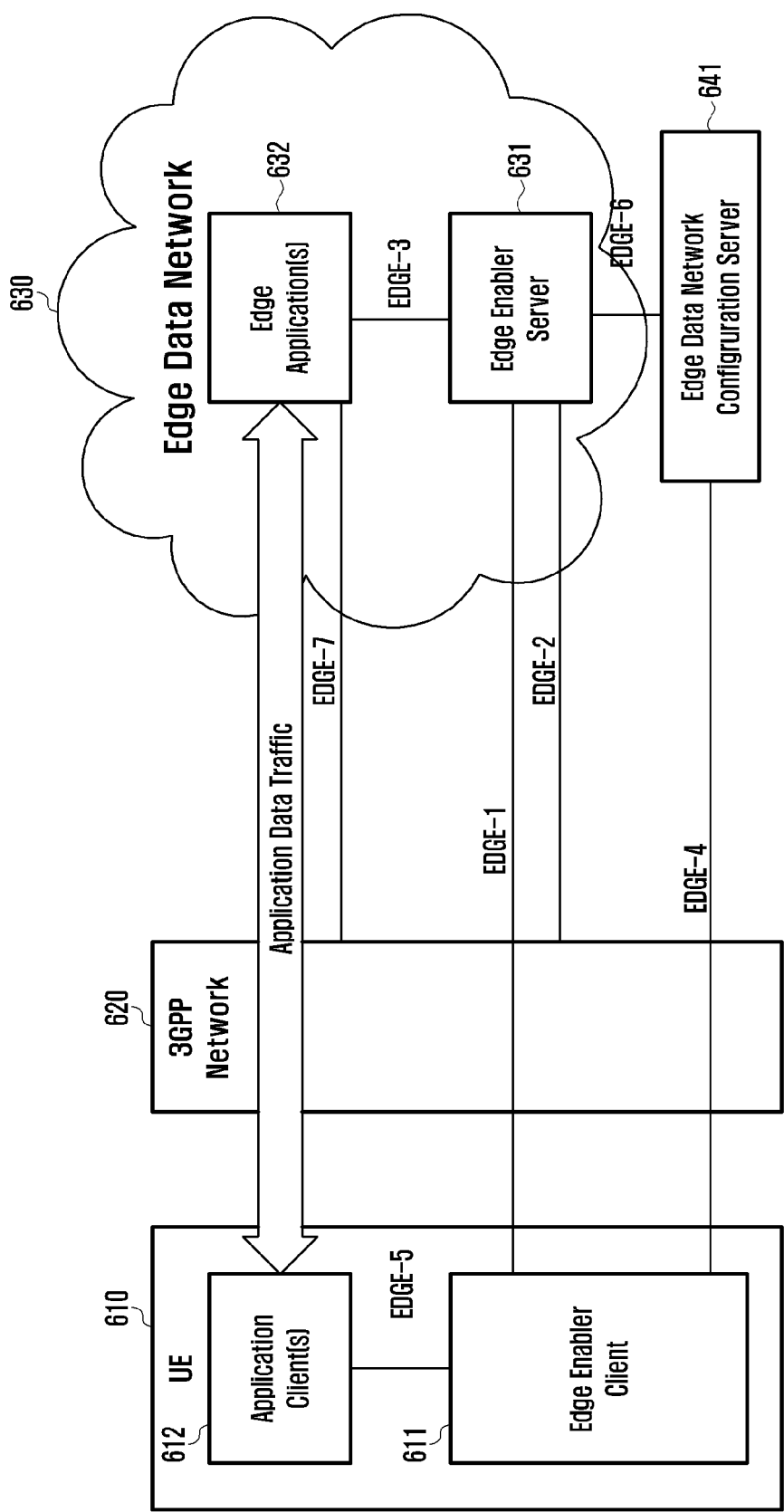
FIG. 6 is a diagram illustrating an application network architecture for edge computing support according to the disclosure.

FIG. 6 is a diagram illustrating an application network architecture for edge computing support.

The network functions (NFs) described in FIG. 6 may be defined as follows. In addition, the NFs may be implemented as one device/computer system/equipment as described above. The above-mentioned matters should be understood equally throughout this disclosure.

- 3GPP Network 620: 3GPP radio access network and core network
- Edge Data Network 630: A data network of 5G core network or packet data network of EPC network, and may be a data network including functions for providing edge computing services such as an edge hosting platform and edge enabling servers, or a data network in which an edge hosting platform hosting an edge application server is located. It may be mapped to local access DN, local data network, or edge computing data network.
- UE Application (Application Client) 612: An application program operating on the mobile operating system of the UE 610, identified by an operating system identifier (OSId) and an operating system specific application identifier (OSAppID) in the 5G core network.
- Edge Application Server 632: A virtual machine (VM) image running on an edge hosting platform or an application server program running in a virtualized container, and a server program that is executed after the VM image is installed and may be called an edge application. In addition, this may refer to the server itself when a specific server runs the above program.
- Edge Data Network Configuration Server (EDN-CS) 641: A server that provides configuration information for the edge data network to the UE, and may be an initial access server that may receive configuration information for the UE to use the MEC service.
- Edge Hosting Platform: A Platform software with a virtualization layer capable of running multiple edge applications. In this disclosure, the edge hosting platform may be used as the same concept as edge hosting environment. Although not specifically illustrated in FIG. 6, the platform software may run on a specific server. The server on which the platform software is run may exist independently, or may be run on another server, for example, an edge enabler server 631 to be described later.
- Orchestrator for Edge Hosting Platform: A management system for managing the edge hosting platform and managing the life cycle of edge applications running on the edge hosting platform. The function of the orchestrator defined in ETSI MANO may be performed. The orchestrator for the above-described edge hosting platform may also run on one specific server.
- Edge Enabler Server 631: A server for providing edge computing services, and may be a server that provides a list of applications available on the edge hosting platform to the UE (edge enabler client manager), manages configuration information for edge applications running on edge computing hosting platform, and provides edge applications with APIs for functions provided by the 3GPP network. The EES 631 may also be a server that manages information on application server applications available for edge hosting environments located on edge data networks, and provides an application program interface (API) for providing edge computing to edge application servers. The EES 631 may provide the UE 610 with information for providing edge computing available in the edge data network. Here, the UE 610 may correspond to one of the UEs 101 and 102 illustrated in FIG. 1.
- Edge Enabler Client 611: A software agent with functions for providing edge computing services to a software module of the UE 610. This may be a software agent that provides the authentication function for accessing the edge computing server of the UE 610, allows the UE to interwork with the edge enabling server to receive information provided by the edge hosting platform, perform routing necessary for the UE application, and provide information to the UE application program.

Figure 7:
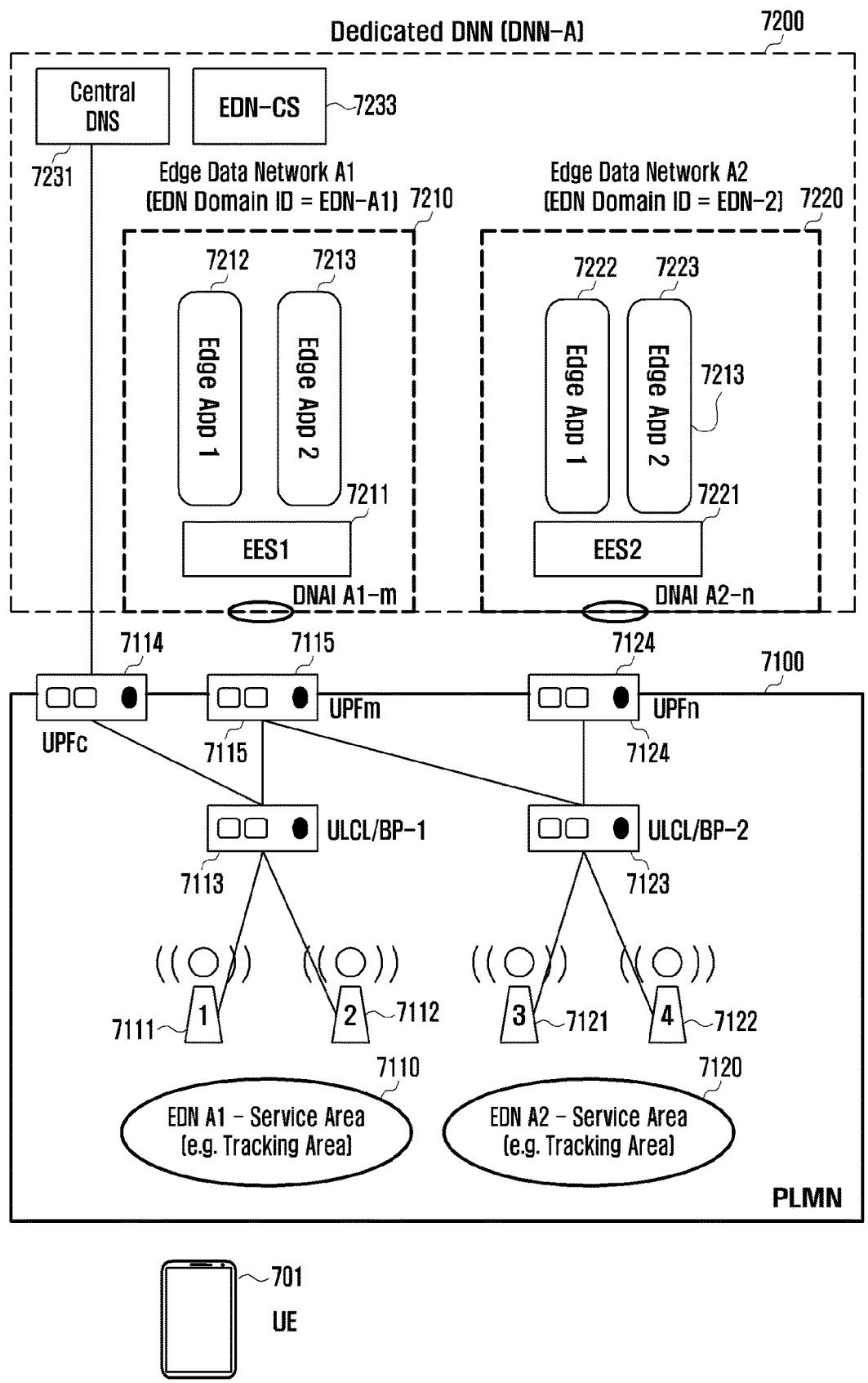
FIG. 7 is a diagram illustrating a relationship between a DNS server, an EDN-CS server, an edge data network connected through UPF and UPF configured for each area, and an edge application server and an edge enabler server present in the edge data network in an application layer in the case of using ULCP/BP according to the disclosure.

FIG. 7 is a diagram illustrating a relationship between a DNS server, an EDN-CS server, an edge data network connected through UPF and UPF configured for each area, and an edge application server and an edge enabler server present in the edge data network in an application layer in the case of using ULCP/BP.

EDN Service Area 7110 and 7120: An area where the edge data networks 7210 and 7220 are provided. In FIG. 7, it may be EDN service areas 7110 and 7120 corresponding to EDN A1 7210 and EDN A2 7220, respectively. For these EDN service areas 7110 and 7120, the mobile network operator may configure the area in advance. The EDN Service Areas 7110 and 7120 may be designated as areas corresponding to areas such as tracking area, cell List, RAN area, UPF service area, SMF service area and Area of Interest, and presence reporting area, which may designate the location of the UE in the 3GPP system. Accordingly, each of the EDN service areas 7110 and 7120 may be mapped to corresponding base stations 7111, 7112, 7121, and 7122. For example, the EDN service area A1 7110 may be an area serviced by the edge data network 7210, and base stations 7111 and 7112 may be mapped. In addition, the EDN service area A2 7120 may be an area serviced by the edge data network 7220, and base stations 7121 and 7122 may be mapped. The edge data networks 7210 and 7220 corresponding to each of the EDN service areas 7110 and 7120 may include EESs 7211 and 7221, and edge application servers 7212, 7213, 7222, and 7223 driven on a platform provided by each of the EESs 7211 and 7221.

Central DNS Server 7231: A DNS server configured as a centralized type. In a case where the UE 701 receives a DNS query from the UE regardless of the UE location in the PLMN, it is a server that provides DNS information to the UE.

User Equipment (UE) 701: A user terminal that may access a mobile communication network. The user terminal may include an application client (e.g., 612 of FIG. 6) indicating an application program installed in the UE, an edge enabler client (e.g., 611 of FIG. 6), and DNS AC, EEC, and DNS resolvers (not illustrated in FIG. 7) that change a domain address into an IP address.

User Plane Function (UPF) 7114, 7115, and 7124: A network function existing in the 3GPP system, and may serve to deliver user plane traffic between the UE and the data network.

Data Network Access Identifier (DNAI): An alias of the UPF, and may be a parameter used to designate one or more UPFs.

The EDN domain ID is an identifier that may identify the EDNs 7210 and 7220 by the DNS server 7231. The DNS server 7231 is used as a delimiter for returning an IP address belonging to an IP domain of a certain EDN through the EDN domain ID delivered by the UE 701 when the UE 701 delivers a DNS request. In the disclosure, the concept of EDN domain ID may be used in the same manner as EDZI.

Embodiments A1, A2, and A3 of the disclosure described below describe operations of a UE and an application layer network server when the UE recognizes the network topology and the relationship between the EDN service area and the EDN domain ID is configured dynamically or in advance in the UE.

The embodiment A1 described in the disclosure describes a procedure for a UE to receive an EDN service area and an EDN domain identifier associated therewith through an initial configuration procedure using an application layer protocol. In addition, the embodiment A2 describes a procedure in which the UE detects the movement of the UE and triggers the initial configuration procedure to receive the EDN service area and the EDN domain identifier associated therewith in the area where the UE is currently located. Accordingly, the operation of A2 may be performed after all or part of the operation of A1 is performed. In addition, the embodiment A3 is a DNS query procedure utilizing an EDN domain ID and a procedure for receiving a DNS response message accordingly. Accordingly, after at least a part of the operation of A1 or at least a part of the operation of A2 is performed, the procedure of A3 may be performed.

In the disclosure, EDN service areas 7110 and 7120 may be cell IDs, Cell lists, registration areas, registration areas available for specific S-NSSAI, NPN areas, PLMN ID(s), LADN service areas, etc. that may specify the location of the UE in the network in the 3GPP system.

Embodiments A1, A2, and A3 describe embodiments characterized by that UE 701 detects the EDN service area, and when the UE 701 moves from the EDN service area 1 7110 to the EDN service area 2 7120 due to the movement of the UE, by deleting the DNS cache information for EDN service zone 1 7110, and configuring the EDN domain ID corresponding to the EDN service zone 2 7120 for the EDN service zone 2, the DNS domain ID is included in the DNS request message to be generated in the future. In addition, the UE 701 may have the same configuration as that of FIG. 6 described above. Accordingly, it is obvious that the UE 701 may be replaced with the UE 610 of FIG. 6.

Embodiment A1

Figure 8:
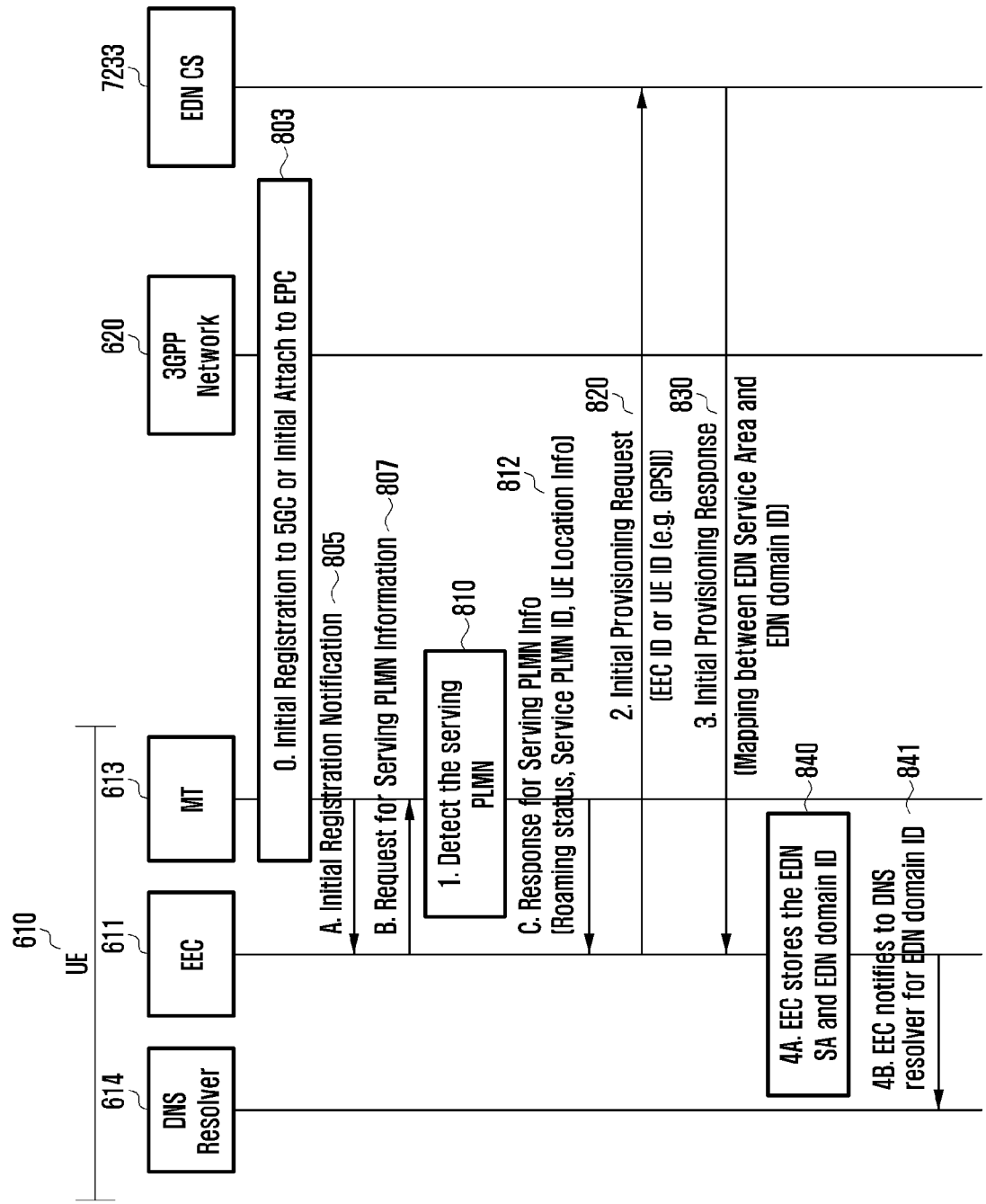
FIG. 8 is a flowchart of an initial configuration procedure using an application layer protocol according to the disclosure.

FIG. 8 illustrates an initial configuration procedure using an application layer protocol according to the disclosure.

In addition, each of the NFs illustrated in FIG. 8 is for convenience of understanding, and if a separate specific NF performing the function described in the disclosure is applied, each NF illustrated in FIG. 8, for example, at least one NF constituting the core network of the 3GPP network 620 and a new NF instead of at least one NF among the EDN CS 7233 may perform the function described below.

In step 803, a modem (mobile UE) 613 (not illustrated in FIG. 6) in the user equipment 610 may perform an initial registration procedure in 5GC. In the case that only the communication function is mentioned in the user equipment 610 described above, the modem may be a mobile UE. In describing the embodiments A1, A2, and A3, it will be assumed that the mobile UE refers to a modem in the user equipment 610. The modem 613 may perform an initial attach procedure to the EPC network. When the modem (MT) 613 of the user equipment 610 performs a successful registration procedure, the modem 613 may transmit a notification message indicating that the initial registration is successful to the EEC 611. In this process, the MT 613 may transmit the serving network ID and the MNC and MCC identifiers of the serving network to the EEC 611.

In step 805, the MT 613 may identify the MNC and MCC identifiers of the serving network in which the user equipment 610 is registered. The process of step 805 may be performed according to the request of the EEC 611 (step 806). Upon receiving the request in step 807, the MT 613 may transmit serving PLMN information to the EEC 611 in step 812. The serving PLMN information may include a current roaming state (roaming or not), a serving PLMN identifier, MNC and MCC of a serving network, and location information (TA and cell ID) of the user equipment 610.

Upon successful registration in the serving PLMN, the user equipment 610 may recognize the MCC and MNC of the Service PLMN, and may configure a predefined address of the EDN CS from the MCC and the MNC.

In step 820, the user equipment 610 may transmit an initial configuration request message to the EDN-CS address. The initial configuration request message may include a user equipment identifier (e.g., GPSI) capable of designating the user equipment 610 or an EEC identifier capable of identifying the EEC 611 of the user equipment 610.

In step 830, the EDN-CS 7233 received the initial configuration request message from the user equipment 610 may search for configuration information for the user equipment 610 stored in advance with the user equipment identifier or the EEC identifier, and transmit the configuration information to the user equipment 610. The configuration information transmitted to the user equipment 610 may include EDN connection information, EDN server area information, EES connection information (e.g., URI address of EES), and edge computing service provider (ECSP) information. In addition, the EDN CS 7233 may configure EDN domain ID information required for the user equipment 610 or the EEC 611 from the storage previously stored in the EDN-CS 7233 and transmit the EDN domain ID information to the EEC 611 of the user equipment 610. The EDN domain ID information includes EDN domain ID information associated with the EDN service area. The information in the initial configuration response message is as described in <Table 1>.

TABLE 1

| IE | Status | Description |
| --- | --- | --- |
| EDN connection info | O | Information required for UE to connect to EDN, DNN, S-NSSAI, etc. |
| EDN Service Area | O | Information indicating service area in 3GPP system such as Tracking Area, Cell List, PLMN ID, NPN ID, etc. |
| EDN Service address | M | Server address information for EEC to access EES in UE |
| EDSP | O | Service provider ID providing edge computing service |
| EDN domain ID accessible in EDN service area | O | Identifier for refer to DNS manage domain in EDN |

In step 840 (4A), the EEC 611 in the user equipment 610 stores the received configuration information. The EEC 611 may configure the modem 613 of the user equipment 610 to deliver a notification when the EDN service area received by the modem 613 is changed.

Embodiment A2

Figure 9:
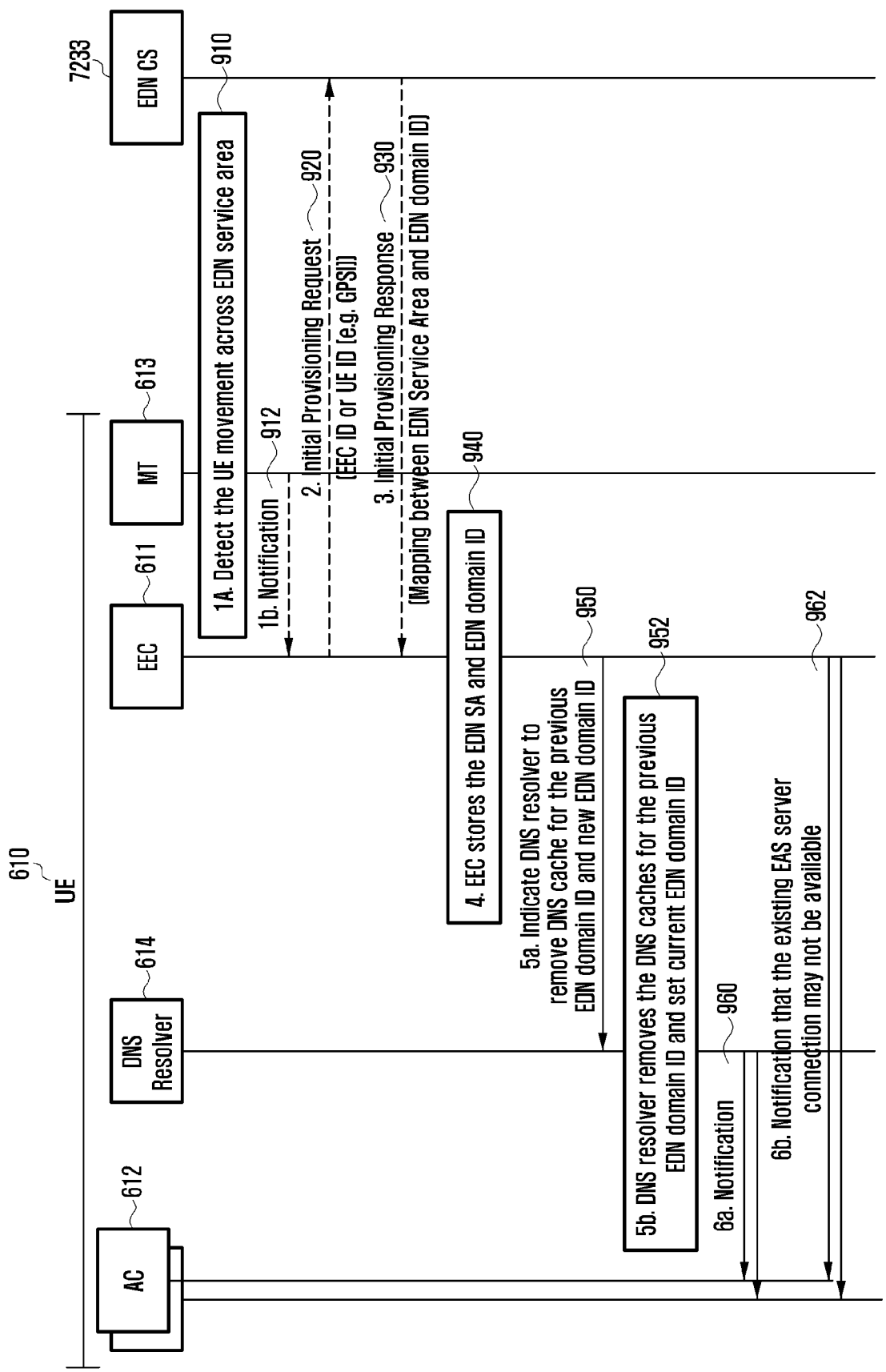
FIG. 9 is a flowchart illustrating an EDN domain ID update procedure according to the disclosure.

FIG. 9 is a flowchart illustrating an EDN domain ID update procedure according to an embodiment of the disclosure.

In describing the flowchart of FIG. 9, in a case where the user equipment 601 enters the EDN service area or leaves the EDN service area, an operation related to the EDN domain ID in the user equipment will be described.

In step 910, when the user equipment 610 moves within the 3GPP system, the modem (MT) 613 in the user equipment 610 may sense (or detect or identify) whether the user equipment 610 has entered the EDN service area or has moved out of the EDN service area. Upon detecting this, the MT 613 notifies the EEC 611 of information that the EDN service area has been moved in step 912.

If there is no EDN configuration information of the operator the new area, the EEC 611 in the user equipment 610 that has detected the movement of the user equipment 610 through steps 920 and 930 may receive the EDN configuration information including the current location of the user equipment 610 by transmitting a configuration request message to the EDN-CS. The message configured in the user equipment 610 may receive information including an EDN service area and an EDN domain ID.

In step 940, the EEC 611 may store EDN service area and EDN domain ID mapping information.

In step 950, the EEC 611 may request (or instruct) the DNS resolver 614 to delete DNS cache information belonging to the existing EDN service area. Through the DNS information deleted by the DNS resolver 614, an indication that the connected application layer connection (e.g., a TCP connection) may no longer be valid may be transmitted to the application program (application client) 612 operating in the user equipment 610. In addition, in step 950, the EEC 611 may transmit a new EDN domain ID corresponding to the area in which the user equipment 610 has entered to the DNS resolver 614. The DNS resolver 614 may configure the current EDN domain ID in step 952 (5b) and use the configured current EDN domain ID when transmitting a new DNS query.

In step 950 (6a), upon detecting that the EAS address accessed by the user equipment 610 may be changed, the application client 612 may interrupt the current connection and generate a connection to the newly updated IP address by the DNS resolver 614, according to the logic of the application.

Embodiment A3

Figure 10:
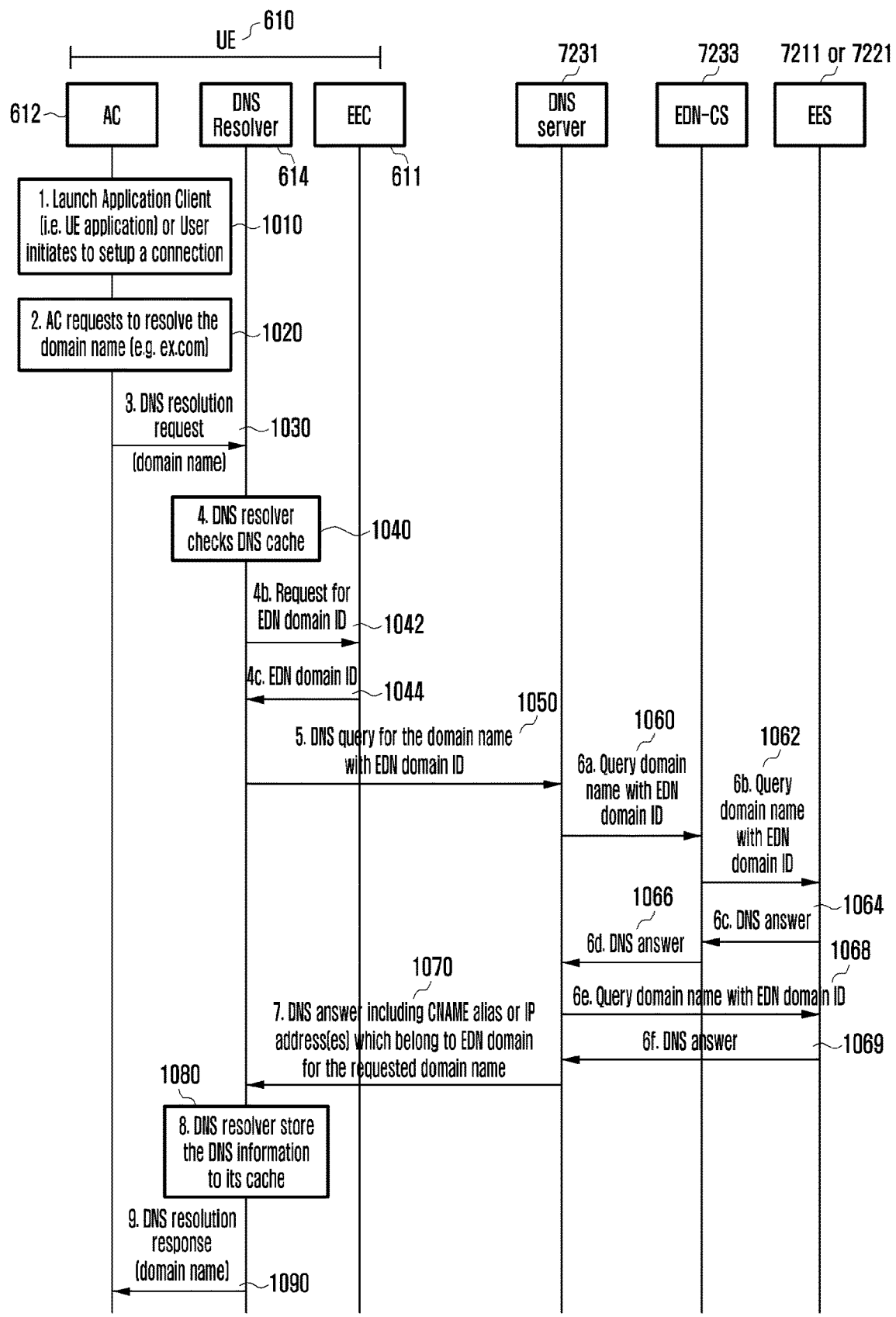
FIG. 10 is a flowchart illustrating a DNS query procedure using an EDN domain ID according to the disclosure.

FIG. 10 is a flowchart illustrating a DNS query procedure using an EDN domain ID according to an embodiment of the disclosure.

In step 1010, the application program 612 installed in the user equipment 610 may attempt to connect the application layer to the EAS.

In steps 1020 and 1030, the application program 612 installed in the user equipment 610 may request a DNS resolution from the DNS resolver 614 to convert the domain address of the EAS into an IP address for connection of the application layer.

In step 1040, the DNS resolver 1040 may identify whether there is information stored in the DNS cache, and if there is information in the DNS cache, skip steps 1050 to 1080 and transmit a DNS resolution response to the application 612 in step 1090.

If the DNS resolver 614 determines to transmit a DNS query in step 1040, the DNS resolver 614 may configure a DNS query message. The DNS query message may include the EDN domain ID currently configured in the EDN resolver 614 along with the requested domain name. In step 1040, when there is no EDN domain ID configured in the DNS resolver, the DNS resolver 614 may proceed to step 1042 and request current EDN domain ID information from the EEC 611. Then, in step 1044, the EEC 611 may provide the current EDN domain ID information to the DNS resolver 614. Alternatively, the DNS resolver 614 may not obtain the EDN domain ID and may include only the domain name.

In step 1050, the DNS resolver 614 may transmit the generated DNS query message to the DNS server 7231.

In step 1060, in a case where the EDN domain ID is included in the DNS query received by the DNS server 7231 from the user equipment 610, the DNS server 7231 may acquire an IP address for a domain name stored differently for each EDN domain ID or an alias domain name for a domain name to configure a DNS response message. As illustrated in steps 1060 to 1066 and 1068 and 1069 to configure different responses for EDN domain IDs, the DNS server 7231 may request the EDN domain ID and the DNS response for the domain name requested by the user equipment 610 from the EDN-CS 7233, and the EDN-CS 7233 or EES 7211 or 7221 may respond to information (IP address for EDN domain for domain name and domain name alias address) included in the DNS response to the request. Upon receiving the query including the EDN domain ID and domain name in step 1060 (6a), the EDN-CS 7233 may determine which EES to inquire the corresponding query through the registered EES information, and transmit a message to the corresponding EES in step 1062 (6b) to receive a DNS response in step 1064 (6c).

In addition, the DNS server 7231 may configure the IP address of the application server and an additional resource record (e.g., DNS SRV, DNS LOC, DNS TXT, etc.) for the IP address in the DNS response. This resource record may be information indicating an edge domain.

In step 1070, the DNS server 7231 configures a DNS response message through information found through steps 1060 to 1066 and/or steps 1068 to 1069, and transmits the DNS response message to the DNS resolver 614 of the user equipment 610. The DNS response message may include an IP address assigned from the corresponding DNS domain ID or a domain name alias address (Canonical NAME alias) for performing another DNS query. A CNAME record corresponds to a resource record that maps one domain name to another (i.e., Canonical Name) in the DNS system. CNAME records are specially processed in the domain name system (DNS). When the DNS resolver 614 encounters a CNAME record in the process of searching for a general resource record, the DNS resolver 614 restarts the DNS query using Canonical Name instead of the original name. The record referred to by the CNAME may indicate any part in the DNS system, and the part referred to by the CNAME may be a local server or a remote server, and may belong to a different DNS domain. For example, the following DNS record may be considered.

| NAME | TYPE | VALUE |
|---|---|---|
| Bar.example.com | CNAME | foo.example.com |
| foo.example.com | A | 192.0.2.23 |

If any of the above DNS records exist, the DNS resolver (614) may view the CNAME record when a record lookup is performed for "bar.examle.com", in which case it will restart the DNS identification process to identify "foo.example.com", and eventually return 192.0.2.23.

In a case where the DNS resolver 614 receives the domain name alias address from the DNS server, the DNS resolver 614 may transmit another DNS query message to the DNS server 7231 by requesting the domain alias address. Upon receiving the DNS query including the domain name alias address, the DNS server 7231 may respond with an IP address corresponding to the domain name alias address.

Alternatively, in a case where the DNS server 7231 configures the IP address of the application server and an additional resource record (e.g., DNS SRV, DNS LOC, DNS TXT, etc.) thereto in the DNS response and transmits them to the user equipment 610, upon receiving them, the user equipment 610 may determine (or identify) whether they have the same value as the ESZI the user equipment owns by viewing the additional resource record information. If the DNS response includes a list of multiple IP addresses and resource records, the user equipment 610 may select the IP address of the application server for the resource record representing the same value based on the value for ESZI information available at the current location. The user equipment 610 may determine (or identify or decide) that the IP address having information mapped to the ESZI obtained from the 5G system is the most suitable IP address that may be used for the edge computing service at the current location of the user equipment 610.

In step 1080, the DNS resolver 614 may store the received DNS information in a DNS cache storage (not shown in the drawing). The DNS cache storage may be implemented as memory or buffer.

In step 1090, the DNS revolver 614 may deliver the IP address corresponding to the requested domain name to the application program.

Next, embodiments A3, A4, and A5 of the disclosure will be described below. The embodiments A3, A4, and A5 described below describe operations of a UE and an application layer network server in which the UE does not recognize the topology of the network and the operations determine a relationship between an EDN service area and an EDN domain ID in a UE according to a location of the UE in a network and inform the UE of the EDN domain ID to be used by the UE so that the UE uses the EDN domain ID.

The embodiment A3 describes a method of performing a DNS resolution request from an application program in a state in which a domain ID is provisioned in the UE. In addition, the embodiment A4 is a procedure for performing a subscription request for a notification service for a change in EDN location information in a provisioning request. The embodiment A5 describes a procedure for notifying the UE when movement to the EDN service area is detected after subscribing in embodiment A4. In the disclosure, at least some of the procedures described in the embodiment A3 may be used or preceded in the embodiment A4. In addition, at least some of the procedures described in the embodiment A3 may be used or preceded in the embodiment A5.

In the disclosure, the EDN service area may be a cell ID, a cell list, a registration area, a registration area in which a specific S-NSSAI may be used, an NPN area, a PLMN ID(s), an LADN service area, or the like, which may specify a location of a UE in a 3GPP system.

In embodiments A3, A4, and A5, it will be described that the network detects the EDN service area and in a case where the UE moves from the EDN service area 1 7110 to the EDN service area 2 7120, the network notifies the UE of a new EDN domain ID for the UE to delete DNS cache information for the EDN service area 1 7110, and configures the EDN domain ID corresponding to the EDN service area 2 to the EDN service area 2 7120, thereby the DNS domain ID is included in the DNS request message that occurs in the future.

Embodiment A4

Figure 11:
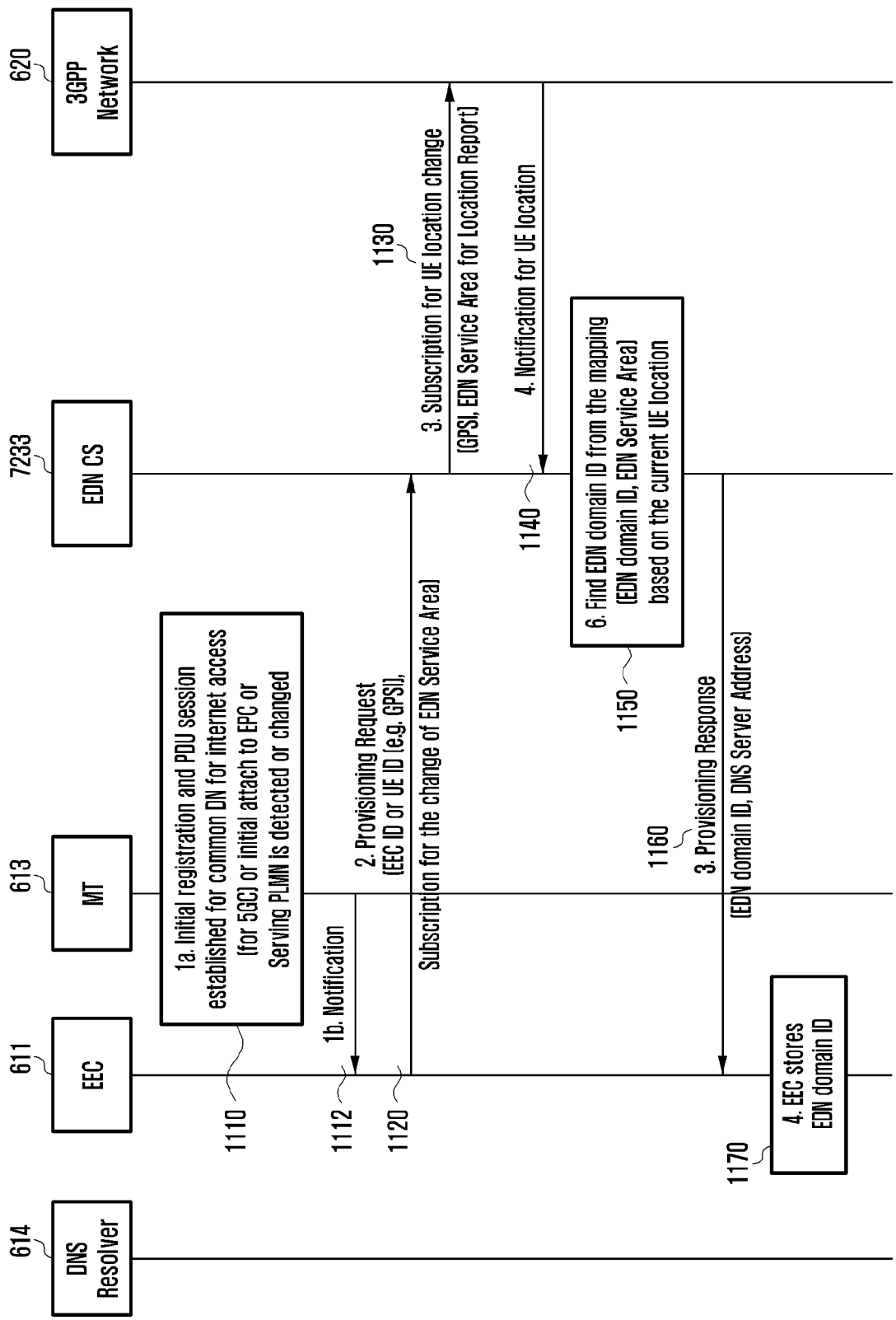
FIG. 11 is a flowchart illustrating a procedure in which the EEC of the UE requests EDN-CS to subscribe to an information change with respect to an EDN service area (or EDN domain ID) change according to the disclosure.

FIG. 11 is a flowchart illustrating a procedure in which the EEC of the user equipment requests EDN-CS to subscribe to an information change with respect to an EDN service area (or EDN domain ID) change.

In step 1110, the modem (mobile UE) 613 of the user equipment 610 performs an initial registration to the 5GC 620 and a configuration procedure for a common DN, or an initial access procedure to the EPC. The modem 613 of the user equipment 610 may detect that the serving PLMN has been changed when moving from EPC to 5GC or after successful execution of the HO procedure in which the serving PLMN is changed in a roaming situation. When the modem (MT) 613 of the user equipment 610 detects a change in the serving PLMN, the modem 613 of the user equipment 610 may deliver a notification indicating that the initial connection has been successfully performed to the EEC 611 in step 1112 (1*b*) or a notification indicating that the serving PLMN has been detected or changed.

In step 1120, the EEC 611 may transmit a message including an initial configuration request message or a notification request service for an EDN service area change to the EDN-CS 7233.

In step 1130, when the EDN-CS 7233 receives a notification request for the EDN service area change in the request message from the user equipment 610, the EDN-CS 7233 may transmit a request message for subscribing to the notification request service for the location change of the user equipment 610 for the corresponding user equipment 610 to the 3GPP network 620. The subscription message may include an identifier (e.g., GPSI) of the user equipment, the EDN service area of the user equipment 610, and an indicator requesting notification when entering/leaving the EDN service area.

When successfully subscribing to the notification service for the movement of the user equipment 610 in the 3GPP network, the EDN-CS may receive the location of the user equipment 610 in response.

EDN-CS 7233 may identify the EDN domain ID available at the current location of the user equipment 610 based on information on the EDN service area associated with the EDN domain ID. Mapping information for the EDN service area and the EDN domain ID may be preconfigured in the EDN-CS 7233, or information may be dynamically updated from a result received by requesting the 3GPP Network 620.

The EDN-CS 7233 identified the EDN domain ID available at the current location of the user equipment 610 transmits the EDN domain ID to the user equipment 610 in step 1160. EDN domain IDs may be multiple. The DNS server address may be forwarded together with the EDN domain ID.

The EEC 611 of the user equipment 610 stores the received EDN domain ID in step 1170. The EEC 611 may deliver the currently available EDN domain ID to the DNS resolver 614 (not shown in the drawing).

Embodiment A5

Figure 12:
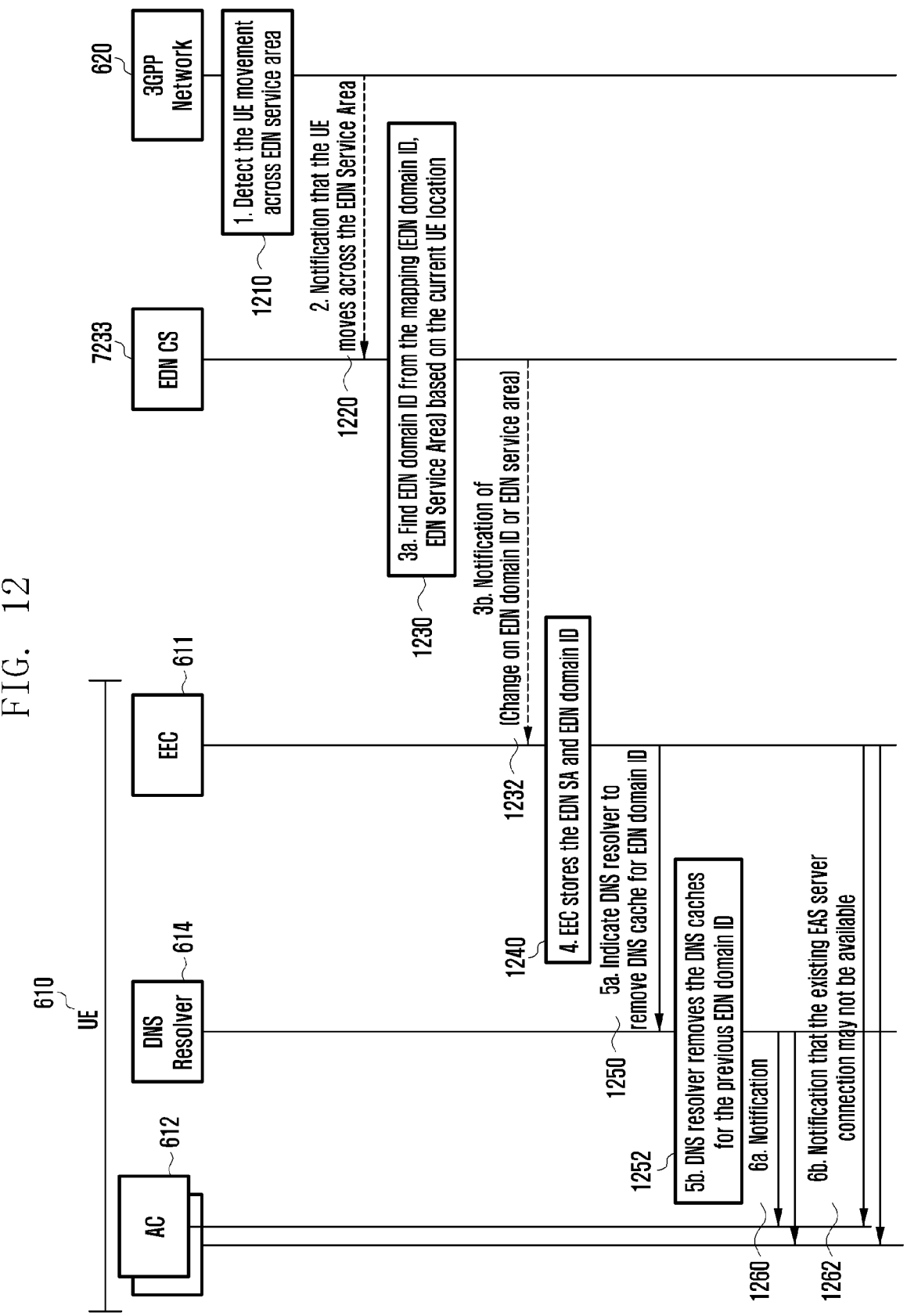
FIG. 12 is a flowchart illustrating a case where an EDN domain ID used by a DNS resolver of a UE is dynamically updated in an EDN-CS, which is an application layer configuration server, according to the disclosure.

FIG. 12 is a flowchart illustrating a case where an EDN domain ID used by a DNS resolver of a user equipment is dynamically updated in an EDN-CS, which is an application layer configuration server, according to the disclosure.

In the embodiment, the EDN-CS 7233 corresponds to a case where the EDN-CS 7233 has already subscribed to a notification service for location information of the user equipment 610 for each EDN service area.

In steps 1210 and 1220, when the user equipment 610 detects an entry into the EDN service area, a departure from the EDN service area, or a change in the EDN service area in the 3GPP network 620, the 3GPP network 620 may report a notification of movement of the user equipment to the EDN-CS 7233. The message may include whether the user equipment 610 enters, leaves, or changes the EDN service area and the current location of the user equipment 610.

In step 1230(3a), the EDN-CS 7233 may determine the EDN domain ID to be used by the user equipment 610 from the current location of the user equipment 610 identified from the EDN domain ID preconfigured within the EDN-CS, mapping information for the EDN service area and the 3GPP network 620. If the EDN domain ID currently set in the user equipment 610 is different from the newly determined EDN domain ID, the EDN-CS 7233 determines a notification (announcement) of the EDN domain ID change to the user equipment 610 and transmits the message in step 1232 (3b). In a manner similar to the notification of the change of the EDN domain ID described above, in a case where the user equipment 610 is subscribed to the EDN service area change, the EDN-CS 7233 may determine the EDN service area change and notify the change.

In step 1240, the EEC 611 receiving the change for the EDN domain ID stores the current EDN service area and the EDN domain ID.

In step 1250, the EEC 611 notifies the DNS resolver 614 that the EDN service area in which the user equipment 610 is located has been changed, and transmits the information that the existing EDN domain ID cannot be used.

In step 1252, the DNS resolver 614 deletes the DNS cache information previously belonging to the EDN service area and sets the newly received EDN domain ID information to the current EDN domain ID. That is, the DNS resolver 614 may update DNS cache information belonging to the EDN service area.

In step 1260, the DNS resolver 614 may inform the fact that the connection (e.g., the TCP connection) of the application layer that transmits the current application layer traffic to the EAS may be cut off due to a change in the EDN service area to which the current user equipment 610 belongs in the application program 612 of the user equipment 610 (6a). As another method, the EEC 611 may inform the fact that the connection (e.g., the TCP connection) of the application layer that transmits the current application layer traffic to the EAS may be cut off due to a change in the EDN service area to which the current user equipment 610 belongs in the application program 612 of the user equipment 610 (6b).

Figure 13:
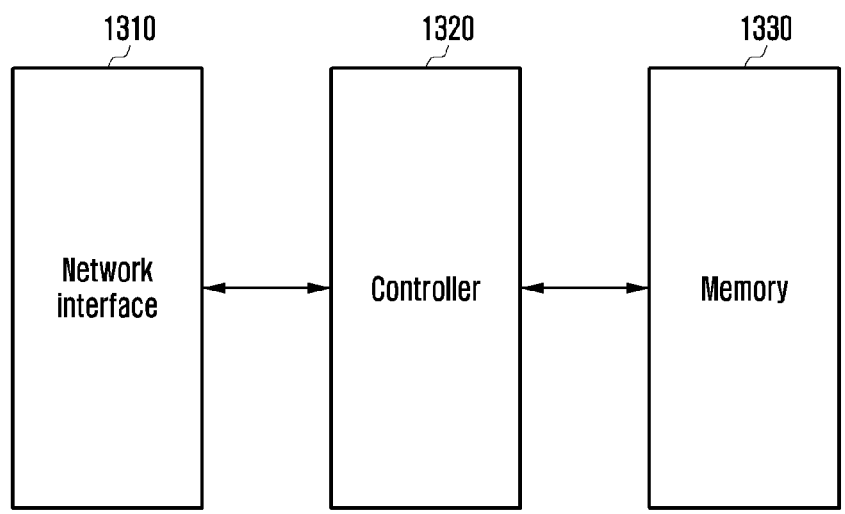
FIG. 13 is a block diagram of an NF according to the disclosure.

FIG. 13 is a block diagram of an NF according to the disclosure.

As described above, NF may be a device that constitutes a mobile communication core network, such as AMF, SMF, UPF, DNS server, NEF, UDR, UDM, etc., and/or a specific node of an edge computing system such as EES, EAS, and ECS.

Referring to FIG. 13, a network interface 1310, a controller 1320, and a memory 1330 may be included.

The network interface 1310 may include a circuit configuration, and may communicate with other network entities of the mobile communication core network under the control of the controller 1320. In addition, the network interface 1310 may communicate with specific entities in an edge computing network. For example, when the NF is the AMF, communication with the SMF, UPF, NRF, UDR, UDM, and/or PCF may be performed. As another example, when the NF is the SMF, communication with the AMF, UPF, NRF, UDR, UDM, and/or PCF may be performed. Similarly, if the NF is a specific one network entity, it may communicate with other entities in the core network. In addition, according to the disclosure, it is possible to communicate directly or indirectly with local DNS as well as EAS, EES, etc.

The controller 1320 may be implemented as at least one processor and/or a program for performing the NF operation. For example, when the NF is the SMF, the controller 1320 may perform the above-described SMF operation. As another example, when the NF is the UPF, the above-described UPF operation may be performed. In the case of other network entities, control necessary for the operations described above may be performed in the same manner.

The memory 1330 may store programs and various types of control information required by the controller 1320, and may store each of the information described in the disclosure in addition. For example, when the NF is AMF/UPF/PCF, the memory may store information received from the AMF/UPF/PCF described above or received from an external entity. As another example, when the NF is the SMF, it is possible to store control information and/or received information necessary for the above-described SMF. In the case of other network entities, information necessary for the operation described above may be stored in the same manner.

The disclosure may be used in a specific network function (NF) or network entity of a mobile communication network when information of an application server is provided to a user equipment in a mobile communication system.

The invention claimed is:

1. A method for providing a domain name system (DNS) query for providing edge computing application server information to a user equipment (UE) by a session management function (SMF) in a mobile communication system, the method comprising:

obtaining first information including authorization information indicating that the UE is permitted to use an edge computing service;

identifying whether a modification of the DNS query for the UE to receive the edge computing service is required based on the first information;

determining an edge computing zone identifier (ESZI) paired with a tracking area list related to a location of the UE, the ESZI being information for identifying which IP domain to search for in a DNS server for the edge computing service; and providing, to a device that transmits the DNS query from the UE to a DNS server, DNS query change information including the ESZI and information indicating a zone ID field in a packet of the DNS query that be modified to the ESZI.

2. The method of claim 1, wherein the first information is UE's subscription information obtained when N4 session for the UE is configured or changed.

3. The method of claim 1, wherein the first information is policy information obtained through a session management policy (SM Policy) establishment procedure from a policy and charging function (PCF).

4. The method of claim 1, wherein the first information is information based on internal configurations of the SMF or configuration information according to network configurations.

5. The method of claim 1, wherein the first information includes detect rule information for detecting a DNS query packet transmitted from the UE to the DNS server.

6. The method of claim 5, wherein a detect rule is a rule for detecting a packet having an IP address of the DNS server as a target IP address or setting the IP address of the DNS server as the target IP address and identifying whether a port number is an IP port number for the DNS query.

7. The method of claim 1, wherein the ESZI is location information on a network mapped with tracking area information.

8. The method of claim 7, wherein the location information on the mapped network is an IP subnet address.

9. The method of claim 1, wherein the DNS query from the UE includes request information for searching for an IP address of an application server corresponding to a fully qualifier domain name (FQDN).

10. A method for providing information of an edge computing application server to a UE by a device forwarding a domain name system (DNS) query in a mobile communication system, the method comprising:

receiving, from a session management function (SMF), DNS query change information for the UE including an edge computing service zone identifier (ESZI) paired with a tracking area list related to a location of the UE and information indicating a zone ID field in a packet of a DNS query that be modified to the ESZI, the ESZI being information for identifying which IP domain to search for in a DNS server for the edge computing service;

receiving, from the UE, the DNS query for searching for an IP address of an edge application server (EAS) corresponding to a fully qualifier domain name (FQDN);

changing the DNS query received from the UE based on the DNS query change information; and transmitting, to a DNS server, the changed DNS query.

11. The method of claim 10, wherein the ESZI is location information on a network mapped with tracking area information.

12. The method of claim 11, wherein the location information on the mapped network is an IP subnet address.

13. The method of claim 10, wherein the DNS query change information further includes detect rule information for detecting a DNS query packet transmitted from the UE to a DNS server when receiving the DNS query change information from the SMF.

14. The method of claim 13, wherein a detect rule is a rule for detecting a packet having an IP address of the DNS server as a target IP address or setting the IP address of the DNS server as the target IP address and identifying whether a port number is an IP port number for the DNS query.

* * * * *